(12) United States Patent
Cozewith et al.

(10) Patent No.: US 7,034,078 B2
(45) Date of Patent: *Apr. 25, 2006

(54) BLENDS MADE FROM PROPYLENE ETHYLENE POLYMERS

(75) Inventors: Charles C. Cozewith, Bellaire, TX (US); Sudhin Datta, Houston, TX (US); Weiguo Hu, Houston, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 12 days.

This patent is subject to a terminal disclaimer.

(21) Appl. No.: 11/049,339

(22) Filed: Feb. 2, 2005

(65) Prior Publication Data

US 2005/0171285 A1 Aug. 4, 2005

Related U.S. Application Data

(60) Division of application No. 10/281,667, filed on Jan. 23, 2003, now Pat. No. 6,921,794, which is a continuation-in-part of application No. 09/834,256, filed on Apr. 12, 2001, now Pat. No. 6,525,157, and a continuation-in-part of application No. 09/342,854, filed on Jun. 29, 1999, now Pat. No. 6,642,316, and a continuation-in-part of application No. 09/346,460, filed on Jul. 1, 1999, now abandoned, and a continuation-in-part of application No. 09/108,467, filed on Jul. 1, 1998, now abandoned, which is a continuation-in-part of application No. 09/108,772, filed on Jul. 2, 1998, now abandoned, which is a continuation-in-part of application No. 08/910,001, filed on Aug. 12, 1997, now Pat. No. 6,635,715.

(51) Int. Cl.
C08L 23/14 (2006.01)
C08L 23/08 (2006.01)

(52) U.S. Cl. .......... 525/240; 526/348; 526/348.6; 526/160; 526/943; 526/130; 526/126

(58) Field of Classification Search ........... 525/280, 525/240
See application file for complete search history.

(56) References Cited

U.S. PATENT DOCUMENTS

| | | | |
|---|---|---|---|
| 3,262,992 A | 7/1966 | Holzer et al. | 260/876 |
| 3,378,606 A | 4/1968 | Kontos | 260/873 |
| 3,758,656 A | 9/1973 | Shih | 260/45.5 P |
| 3,853,969 A | 12/1974 | Kontos | 260/897 A |
| 3,882,197 A | 5/1975 | Fritz et al. | 260/897 A |
| 3,888,949 A | 6/1975 | Shih | 260/897 A |
| 3,998,911 A | 12/1976 | Strametz et al. | 260/878 B |
| 4,411,821 A | 10/1983 | Howard, Jr. | 502/227 |
| 4,491,652 A | 1/1985 | Matthews et al. | 525/247 |
| 4,540,753 A | 9/1985 | Cozewith et al. | 526/88 |
| 4,542,199 A | 9/1985 | Kaminsky et al. | 526/160 |
| 4,543,399 A | 9/1985 | Jenkins, III et al. | 526/70 |
| 4,588,790 A | 5/1986 | Jenkins, III et al. | 526/70 |
| 4,752,597 A | 6/1988 | Turner | 502/104 |
| 4,808,561 A | 2/1989 | Welborn, Jr. | 502/104 |
| 4,859,757 A * | 8/1989 | Pellon et al. | 526/348 |
| 4,871,705 A | 10/1989 | Hoel | 502/117 |
| 4,897,455 A | 1/1990 | Welborn, Jr. | 526/129 |
| 4,912,075 A | 3/1990 | Chang | 502/107 |
| 4,937,217 A | 6/1990 | Chang | 502/111 |
| 4,937,301 A | 6/1990 | Chang | 526/123 |
| 5,008,228 A | 4/1991 | Chang | 502/111 |
| 5,017,714 A | 5/1991 | Welborn, Jr. | 556/12 |
| 5,028,670 A | 7/1991 | Chinh et al. | 326/73 |
| 5,057,475 A | 10/1991 | Canich et al. | 502/104 |
| 5,086,025 A | 2/1992 | Chang | 502/117 |
| 5,120,867 A | 6/1992 | Welborn, Jr. | 556/12 |
| 5,132,262 A | 7/1992 | Rieger et al. | 502/117 |
| 5,147,949 A | 9/1992 | Chang | 526/129 |
| 5,153,157 A | 10/1992 | Hlatky et al. | 502/117 |
| 5,198,401 A | 3/1993 | Turner et al. | 502/155 |
| 5,238,892 A | 8/1993 | Chang | 502/111 |
| 5,243,001 A | 9/1993 | Winter et al. | 526/127 |
| 5,278,119 A | 1/1994 | Turner et al. | 502/155 |
| 5,278,264 A | 1/1994 | Spaleck et al. | 526/127 |
| 5,296,434 A | 3/1994 | Karl et al. | 502/117 |
| 5,304,614 A | 4/1994 | Winter et al. | 526/127 |
| 5,324,800 A | 6/1994 | Welborn et al. | 526/160 |
| 5,331,054 A | 7/1994 | Fujita et al. | 525/240 |
| 5,387,568 A | 2/1995 | Ewen et al. | 502/104 |
| 5,391,629 A | 2/1995 | Turner et al. | 526/268 |
| 5,416,178 A | 5/1995 | Winter et al. | 526/160 |
| 5,455,305 A | 10/1995 | Galambos | 525/240 |
| 5,461,113 A | 10/1995 | Marczinke et al. | 525/193 |
| 5,504,172 A | 4/1996 | Imuta et al. | 526/351 |

(Continued)

FOREIGN PATENT DOCUMENTS

EP 0128046 12/1984

(Continued)

OTHER PUBLICATIONS

Derwent Abstract for EP 0 480 190 A.

(Continued)

*Primary Examiner*—David W. Wu
*Assistant Examiner*—Rip A. Lee
(74) *Attorney, Agent, or Firm*—Leandro Arechederra

(57) ABSTRACT

Polymer blend compositions of a first polymer component comprising an ethylene propylene copolymer and a second polymer component comprising an isotactic polypropylene copolymer. The first polymer component has a uniform distribution of both tacticity and comonomer between copolymer chains. Further, the first polymer component will exhibit a statistically insignificant intramolecular difference of tacticity.

42 Claims, 4 Drawing Sheets

U.S. PATENT DOCUMENTS

| | | | |
|---|---|---|---|
| 5,516,848 A | 5/1996 | Canich et al. | 525/240 |
| 5,539,056 A | 7/1996 | Yang et al. | 525/280 |
| 5,576,259 A | 11/1996 | Hasegawa et al. | 502/117 |
| 5,585,448 A | 12/1996 | Resconi et al. | 526/170 |
| 5,594,080 A | 1/1997 | Waymouth et al. | 526/126 |
| 5,618,895 A | 4/1997 | Kerth et al. | 526/129 |
| 5,700,896 A | 12/1997 | Dolle et al. | 526/351 |
| 5,710,223 A * | 1/1998 | Fukuoka et al. | 526/127 |
| 5,747,621 A | 5/1998 | Resconi et al. | 526/351 |
| 5,763,534 A | 6/1998 | Srinivasan et al. | 525/240 |
| 5,840,808 A | 11/1998 | Sugimura et al. | 525/263 |
| 5,869,584 A | 2/1999 | Winter et al. | 526/127 |
| 5,936,053 A * | 8/1999 | Fukuoka et al. | 526/351 |
| 5,959,046 A * | 9/1999 | Imuta et al. | 526/127 |
| 6,048,950 A | 4/2000 | Dolle et al. | 526/126 |
| 6,344,530 B1 * | 2/2002 | Sugano et al. | 526/160 |
| 6,410,662 B1 * | 6/2002 | Ushioda et al. | 526/127 |
| 6,525,157 B1 | 2/2003 | Cozewith et al. | 526/348 |
| 6,635,715 B1 | 10/2003 | Datta et al. | 525/240 |
| 6,642,316 B1 | 11/2003 | Datta et al. | 525/240 |
| 6,867,260 B1 | 3/2005 | Datta et al. | 525/191 |
| 6,921,794 B1 | 7/2005 | Cozewith et al. | 525/240 |
| 2004/0014896 A1 | 1/2004 | Datta et al. | 525/240 |
| 2004/0116609 A1 | 6/2004 | Datta et al. | 525/240 |
| 2004/0236026 A1 | 11/2004 | Datta et al. | 525/240 |
| 2004/0236042 A1 | 11/2004 | Datta et al. | 526/126 |
| 2005/0131155 A1 | 6/2005 | Cozewith et al. | 525/192 |
| 2005/0159553 A1 | 7/2005 | Cozewith et al. | 525/192 |
| 2005/0197461 A1 | 9/2005 | Datta et al. | 525/240 |
| 2005/0203252 A1 | 9/2005 | Datta et al. | 525/240 |

FOREIGN PATENT DOCUMENTS

| | | |
|---|---|---|
| EP | 0277003 | 8/1988 |
| EP | 0277004 | 8/1988 |
| EP | 0302424 | 2/1989 |
| EP | 0374695 | 6/1990 |
| EP | 0178913 | 3/1991 |
| EP | 0426637 | 5/1991 |
| EP | 0427697 | 5/1991 |
| EP | 0480190 | 4/1992 |
| EP | 0495375 | 7/1992 |
| EP | 0520732 | 12/1992 |
| EP | 0538749 | 4/1993 |
| EP | 0550214 | 7/1993 |
| EP | 0573403 | 12/1993 |
| EP | 0582194 | 2/1994 |
| EP | 0646624 | 4/1995 |
| EP | 0695765 | 2/1996 |
| EP | 0890584 | 1/1999 |
| JP | 7-149832 | 6/1995 |
| JP | 7-149832 A * | 6/1995 |
| NL | 1342647 | 1/1974 |
| WO | 87/02991 | 5/1987 |
| WO | 92/00333 | 1/1992 |
| WO | 93/06169 | 4/1993 |
| WO | 96/06132 | 2/1996 |
| WO | WO 96/24623 | 8/1996 |
| WO | WO 96/28525 | 9/1996 |
| WO | 98/39384 | 9/1998 |
| WO | 97/10300 | 1/1999 |
| WO | WO 99/01485 | 1/1999 |
| WO | 97/07788 | 2/1999 |

OTHER PUBLICATIONS

" Impact Fracture Toughness of Propylene/1—Pentene Random Copolymers", Tincul, et al., Polymer Material Sci. Eng., PMSEDG 79, pp 190-191, 1998.

Derwent Abstract for EP 0 890 584A.

*Macromolecules*, vol. 31, 1998, pp. 6908-6916, "Elastomeric Polypropylenes from Unbridged(2-Phenylindene)zirconocene Catalysts: Thermal Characterization and Mechanical Properties", Yirong Hu, Mark T. Krejchi, Chirag D. Shah, Charles L. Myers and Robert M. Waymouth.

"C NMR Analysis of Ethylene-Propylene Rubbers", *Macromolecules*, vol. 17, 1984, pp 1950-1955, H. N. Cheng.

*Macromolecules*, v. 22 (10)—1989—pp. 3851-3858—"Elastomeric Polypropylenes from Alumina-Supported Tetraalkyl Group IVB Catalysts. 1. Synthesis and Properties of High Molecular Weight Stereoblock Hopolymers"—John W. Collette, et al.

*Macromolecules*, v. 21 (12)—1988—pp. 3360-3371—"Near Monodisperse Ethylene-Propylene Copolymers by Direct Ziegler-Natta Polymerization. Properties, Characterization, Properties"—G. Ver Strate, et al.

ASTM D 3900-95—"Standard Test Methods for Rubber Raw—Determination of Ethylene Units in EPM (Ethylene-Propylene Copolymers) and EPDM (Ethylene-Propylene-Diene Terpolymers)"—American Society for Testing & Materials.

ASTM D 1646-96a—"Standard Test Methods for Rubber-13 Viscosity, Stress Relaxation, and Pre-Vulcanization Characteristics (Mooney Viscometer)"—American Society for Testing & Materials.

*Science*, vol. 267, Jan. 13, 1995, pp. 217-219, "Oscillating Stereocontrol: A Strategy for the Synthesis of Thermoplastic Elastomeric Polypropylene", Geoffrey W. Coates and Robert M. Waymouth.

*Macromolecules*, vol. 32, 1999, pp. 8283-8290, "Regioirregular Propene, Insertion in Polypropenes Synthesized with Unbridged Bis(2-aryl)indenyl Zirconium Dichloride Catalysts: Implications on Activity", Shirley Lin and Robert M. Waymouth.

*Macromolecules*, vol. 32, 1999, pp. 3334-3340, "Elastomeric Polypropylenes from Unbridged 2-Phenylindene Zirconocene Catalysts: Temperature Dependence of Crystallinity and Relaxation Properties", Yirong Hu, Eric D. Carlson, Gerald G. Fuller, and Robert M. Waymouth.

*Macromolecules*, vol. 32, 1999, pp. 8100-8106, "Component Relaxation Processes within Elastomeric Polypropylene", Eric D. Carlson, Gerald G. Fuller and Robert M. Waymouth.

JP translation for Application No. S62-119215, entitled "Propylene-Based Random Co-Polymer and Its Usage", Kokai Patent official Gazette, published May 30, 1987.

U.S. Appl. No. 11/058,789, Datta et al., filed Feb.16, 2005, entitled "Thermoplastic Polymer Blends of Isotactic Polyropylene and Alpha-Olefin/Propylene Copolymers" (1997B050/4).

U.S. Appl. No. 11/123,767, Datta et al., filed May 6, 2005, entitled "Thermoplastic Polymer Blends of Isotactic Polyropylene and Alpha-Olefin/Propylene Copolymers" (1997B050/5).

Preliminary Amendment for U.S. Appl. No. 11/123,647, Datta et al., filed May 6, 2005, entitled "Thermoplastic Polymer Blends of Isotactic Polypropylene and Alpha-Olefin/Propylene Copolymers" (1997B050/6).

U.S. Appl. No. 11/123,647, Datta et al., filed May 6, 2005, entitled "Thermoplastic Polymer Blends of Isotactic Polypropylene and Alpha-Olefin/Propylene Copolymers" (1997B050/6).

Preliminary Amendment for U.S. Appl. No. 11/123,279, Datta et al., filed May 6, 2005, entitled "Thermoplastic Polymer Blends of Isotactic Polypropylene and Alpha-Olefin/Propylene Copolymers" (1997B050/8).

U.S. Appl. No. 11/123,279 Datta et al., filed May 6, 2005, entitled "Thermoplastic Polymer Blends of Isotactic Polypropylene and Alpha-Olefin/Propylene Copolymers" (1997B050/8).

Preliminary Amendment for U.S. Appl. No. 11/213,508, Datta et al., filed Aug. 26, 2005, entitled "Thermoplastic Polymer Blends of Isotactic Polypropylene and Alpha-Olefin/Propylene Copolymers" (1997B050/9).

U.S. Appl. No. 11/213,508, Datta et al., filed Aug. 26, 2005, entitled "Thermoplastic Polymer Blends of Isotactic Polypropylene and Alpha-Olefin/Propylene Copolymers" (1997B050/9).

Preliminary Amendment for U.S. Appl. No. 11/213,531, Datta et al., filed Aug. 26, 2005, entitled "Thermoplastic Polymer Blends of Isotactic Polypropylene and Alpha-Olefin/Propylene Copolymers" (1997B050/10).

U.S. Appl. No. 11/213,531, Datta et al., filed Aug. 26, 2005, entitled "Thermoplastic Polymer Blends of Isotactic Polypropylene and Alpha-Olefin/Propylene Copolymers" (1997B050/10).

Preliminary Amendment for U.S. Appl. No. 11/213,537, Datta et al., filed Aug. 26, 2005, entitled "Thermoplastic Polymer Blends of Isotactic Polypropylene and Alpha-Olefin/Propylene Copolymers" (1997B050/11).

U.S. Appl. No. 11/213,537, Datta et al., filed Aug. 26, 2005, entitled "Thermoplastic Polymer Blends of Isotactic Polypropylene and Alpha-Olefin/Propylene Copolymers" (1997B050/11).

U.S. Appl. No. 10/961,068, Datta et al., filed Oct. 12, 2004, entitled "Elastic Blends Comprising Crystalline Polymer and Crystallizable Polymers of Propylene" (1998B037A/5).

Preliminary Amendment for U.S. Appl. No. 10/961,068, Datta et al., filed Oct. 12, 2004, entitled "Elastic Blends Comprising Crystalline Polymer and Crystallizable Polymers of Proplene" (1998B037A/5).

U.S. Appl. No. 10/970,789, Datta et al., filed Oct. 21, 2004, entitled "Elastic Blends Comprising Crystalline Polymer and Crystallizable Polymers of Propylene" (1998B037A/6).

Preliminary Amendment for U.S. Appl. No. 10/970,789 Datta et al., filed Oct. 21, 2004, entitled "Elastic Blends Comprising Crystalline Polymer and Crystallizable Polymers of Propylene" (1998B037A/6).

U.S. Appl. No. 10/972,244, Datta et al., filed Oct. 22, 2004, entitled "Elastic Blends Comprising Crystalline Polymer and Crystallizable Polymers of Propylene" (1998B037A/7).

Preliminary Amendment for U.S Appl. No. 10/972,244, Datta et al., filed Oct. 22, 2004, entitled "Elastic Blends Comprising Crystalline Polymer and Crystallizable Polymers of Propylene" (1998B037A/7).

U.S. Appl. No. 10/984,900, Datta et al., filed Nov. 10, 2004, entitled "Elastic Blends Comprising Crystalline Polymer and Crystallizable Polymers of Propylene" (1998B037A/8).

Preliminary Amendment for U.S. Appl. No. 10/984,900, Datta et al., filed Nov. 10, 2004, entitled "Elastic Blends Comprising Crystalline Polymer and Crystallizable Polymers of Propylene" (1998B037A/8).

U.S. Appl. No. 11/196,031, Datta et al., filed Aug. 3, 2005, entitled "Elastic Blends Comprising Crystalline Polymer and Crystallizable Polymers of Propylene" (1998B037A/10).

Preliminary Amendment for U.S. Appl. No. 11/196,031, Datta et al., filed Aug. 3, 2005, entitled "Elastic Blends Comprising Crystalline Polymer and Crystallizable Polymers of Propylene" (1998B037A/10).

U.S. Appl. No. 11/195,987, Datta et al., filed Aug. 3, 2005, entitled "Elastic Blends Comprising Crystalline Polymer and Crystallizable Polymers of Propylene" (1998B037A/11).

Preliminary Amendment for U.S. Appl. No. 11/195,987, Datta et al., filed Aug. 3, 2005, entitled "Elastic Blends Comprising Crystalline Polymer and Crystallizable Polymers of Propylene" (1998B037A/11).

U.S. Appl. No. 11/196,637, Datta et al., filed Aug. 3, 2005, entitled "Elastic Blends Comprising Crystalline Polymer and Crystallizable Polymers of Propylene" (1998B037A/12).

Preliminary Amendment for U.S. Appl. No. 11/196,637, Datta et al., filed Aug. 3, 2005, entitled "Elastic Blends Comprising Crystalline Polymer and Crystallizable Polymers of Propylene" (1998B037A/12).

* cited by examiner

BLENDS MADE FROM PROPYLENE ETHYLENE POLYMERS

CROSS REFERENCE TO RELATED APPLICATIONS

This application is a divisional application of Ser. No. 10/281,667, filed Jan. 23, 2003, now U.S. Pat. No. 6,921,794, which is a continuation-in-part of Ser. No. 09/834,256, filed Apr. 12, 2001, now U.S. Pat. No. 6,525,157, which is a continuation-in-part of Ser. No. 08/910,001, filed Aug. 12, 1997, now U.S. Pat. No. 6,635,715; Ser. No. 09/108,467, filed Jul. 1, 1998, now abandoned; Ser. No. 09/342,854, filed Jun. 29, 1999, now U.S. Pat. No. 6,642,316; and Ser. No. 09/346,460, filed Jul. 1, 1999, now abandoned, which is a continuation-in-part of Ser. No. 09/108,772, filed Jul. 2, 1998, now abandoned; the disclosures of these documents are incorporated by reference.

FIELD

Embodiments of the present invention include blends made with copolymers of ethylene and propylene, in the substantial absence of dienes.

BACKGROUND

Ethylene propylene copolymers made with metallocene catalysts are known. Many such copolymers are intermolecularly heterogeneous in terms of tacticity, composition (weight percent comonomers) or both. Further, such polymers may also, or in the alternative, be compositionally heterogeneous within a polymer chain. Such characteristics may be, but are not always, the result of multiple reactor schemes or sequential addition of polymer.

The elasticity, flexural modulus and tensile strength of such copolymers, when considered in the aggregate, may not reach a satisfactory level for use in commercial elastomeric operation.

U.S. Pat. No. 5,747,621 suggests fractionable reactor blend polypropylenes, directly obtainable from the polymerization reaction of propylene having 30 to 90% by weight of a boiling n-heptane fraction, soluble in xylene at 135° C. In Table 2 of this document, the only fractionation disclosed, each of the solvents appears to be at its boiling point. Further, reference to this table shows that the diethyl-ether fraction has no melting point (amorphous).

In the journal articles *Science*, Vol. 267, pp 217–219 (1995); *Macromolecules*, Vol. 31, pp 6908–6916 (1998); and *Macromolecules*, Vol. 32, pp 8283–8290, pp 3334–3340 and pp 8100–8106, propylene polymers with similar characteristics as those disclosed in the above discussed U.S. Pat. No. 5,747,621 are made and fractionated. The polymers are made with bis(aryl indenyl) or bisindenyl metallocene catalysts. In these journal articles, these polymers are fractionated in boiling ether and heptane, leaving a portion of the polymer insoluble in either. The polypropylenes are stated to be compositionally heterogeneous in terms of tacticity and molecular weight.

U.S. Pat. No. 5,504,172 suggests a propylene elastomer that has properties such that:
(a) the elastomer contains propylene units in an amount of 50 to 95% by mol and ethylene units in an amount of 5 to 50% by mol;
(b) a triad tacticity of three propylene units-chains consisting of head-to-tail bonds, as measured by $^{13}C$ NMR, is not less than 90.0%; and
(c) a proportion of inversely inserted propylene units based on the 2,1-insertion of a propylene monomer in all propylene insertions, as measured by $^{13}C$ NMR, is not less than 0.5%, and a proportion of inversely inserted propylene units based on the 1,3-insertion of a propylene monomer, as measured by $^{13}C$ NMR, is not more than 0.05%.

U.S. Pat. No. 5,391,629 suggests block and tapered copolymers of ethylene with an α-olefin. The copolymers are made by a process of sequentially contacting ethylene with an α-olefin monomer in the presence of an activated cyclopentadienyl catalyst system.

EP 0 374 695 suggests ethylene-propylene copolymers and a process for preparing them. The copolymers have a reactivity ratio product, $r_1 r_2$, between 0.5 and 1.5 and an isotactic index greater than 0 percent. The copolymers are produced in the presence of a homogeneous chiral catalyst and an alumoxane co-catalyst.

There is a commercial need therefore for an ethylene propylene copolymer and that will show a melting point and an excellent balance of elasticity, flexural modulus and tensile strength, and for blends made from such copolymers.

SUMMARY

We have discovered that ethylene-propylene copolymers, when produced in the presence of a metallocene catalyst and an activator, in a single steady state reactor, show a surprising and unexpected balance of flexural modulus, tensile strength and elasticity. Moreover, these and other properties of the copolymers show surprising differences relative to conventional polymer blends, such as blends of isotactic polypropylene and ethylene-propylene copolymers.

In one embodiment, the copolymer includes from a lower limit of 5% or 6% or 8% or 10% by weight to an upper limit of 20% or 25% by weight ethylene-derived units, and from a lower limit of 75% or 80% by weight to an upper limit of 95% or 94% or 92% or 90% by weight propylene-derived units, the percentages by weight based on the total weight of propylene- and ethylene-derived units. The copolymer is substantially free of diene-derived units.

In various embodiments, features of the copolymers include some or all of the following characteristics, where ranges from any recited upper limit to any recited lower limit are contemplated:
(i) a melting point ranging from an upper limit of less than 110° C., or less than 90° C., or less than 80° C., or less than 70° C., to a lower limit of greater than 25° C., or greater than 35° C., or greater than 40° C., or greater than 45° C.;
(ii) a relationship of elasticity to 500% tensile modulus such that Elasticity≦0.935M+12, or Elasticity≦0.935M+6, or Elasticity≦0.935M, where elasticity is in percent and M is the 500% tensile modulus in megapascal (MPa);
(iii) a relationship of flexural modulus to 500% tensile modulus such that Flexural Modulus≦4.2$e^{0.27M}$+50, or Flexural Modulus≦4.2$e^{0.27M}$+30, or Flexural Modulus≤4.2e^{0.27M}+10, or Flexural Modulus≤4.2e^{0.27M}+2, where flexural modulus is in MPa and M is the 500% tensile modulus in MPa;

(iv) a heat of fusion ranging from a lower limit of greater than 1.0 joule per gram (J/g), or greater than 1.5 J/g, or greater than 4.0 J/g, or greater than 6.0 J/g, or greater than 7.0 J/g, to an upper limit of less than 125 J/g, or less than 100 J/g, or less than 75 J/g, or less than 60 J/g, or less than 50 J/g, or less than 40 J/g, or less than 30 J/g;.

(v) a triad tacticity as determined by carbon-13 nuclear magnetic resonance ($^{13}$C NMR) of greater than 75%, or greater than 80%, or greater than 85%, or greater than 90%;

(vi) a tacticity index m/r ranging from a lower limit of 4 or 6 to an upper limit of 8 or 10 or 12;

(vii) a proportion of inversely inserted propylene units based on 2,1 insertion of propylene monomer in all propylene insertions, as measured by $^{13}$C NMR, of greater than 0.5% or greater than 0.6%;

(viii) a proportion of inversely inserted propylene units based on 1,3 insertion of propylene monomer in all propylene insertions, as measured by $^{13}$C NMR, of greater than 0.05%, or greater than 0.06%, or greater than 0.07%, or greater than 0.08%, or greater than 0.085%;

(ix) an intermolecular tacticity such that at least X % by weight of the copolymer is soluble in two adjacent temperature fractions of a thermal fractionation carried out in hexane in 8° C. increments, where X is 75, or 80, or 85, or 90, or 95, or 97, or 99;

(x) a reactivity ratio product $r_1 r_2$ of less than 1.5, or less than 1.3, or less than 1.0, or less than 0.8;

(xi) a molecular weight distribution Mw/Mn ranging from a lower limit of 1.5 or 1.8 to an upper limit of 40 or 20 or 10 or 5 or 3;

(xii) a molecular weight of from 15,000–5,000,000;

(xiii) a solid state proton nuclear magnetic resonance ($^1$H NMR) relaxation time of less than 18 milliseconds (ms), or less than 16 ms, or less than 14 ms, or less than 12 ms, or less than 10 ms;

(xiv) an elasticity as defined herein of less than 30%, or less than 20%, or less than 10%, or less than 8%, or less than 5%; and (xv) a 500% tensile modulus of greater than 0.5 MPa, or greater than 0.8 MPa, or greater than 1.0 MPa, or greater than 2.0 MPa.

The copolymer be made in the presence of a bridged metallocene catalyst, in a single steady-state reactor. Thus, in another aspect, the present invention is directed to a process for producing an ethylene-propylene copolymer having some or all of the above-recited characteristics, by reacting ethylene and propylene in a steady-state reactor under reactive conditions and in the presence of a bridged metallocene catalyst.

In an embodiment, the novel ethylene-propylene copolymer is blended with a second polymer component comprising a copolymer of propylene, and at least one other alpha-olefin having less than 6 carbon atoms, said second polymer component comprising crystallizable propylene sequence and at least 75% by weight propylene.

DESCRIPTION OF THE DRAWINGS

These and other features, aspects and advantages of embodiments of our invention will become better understood with reference to the following description, appended claims and accompanying drawings, in which:

DESCRIPTION

Figure 1:
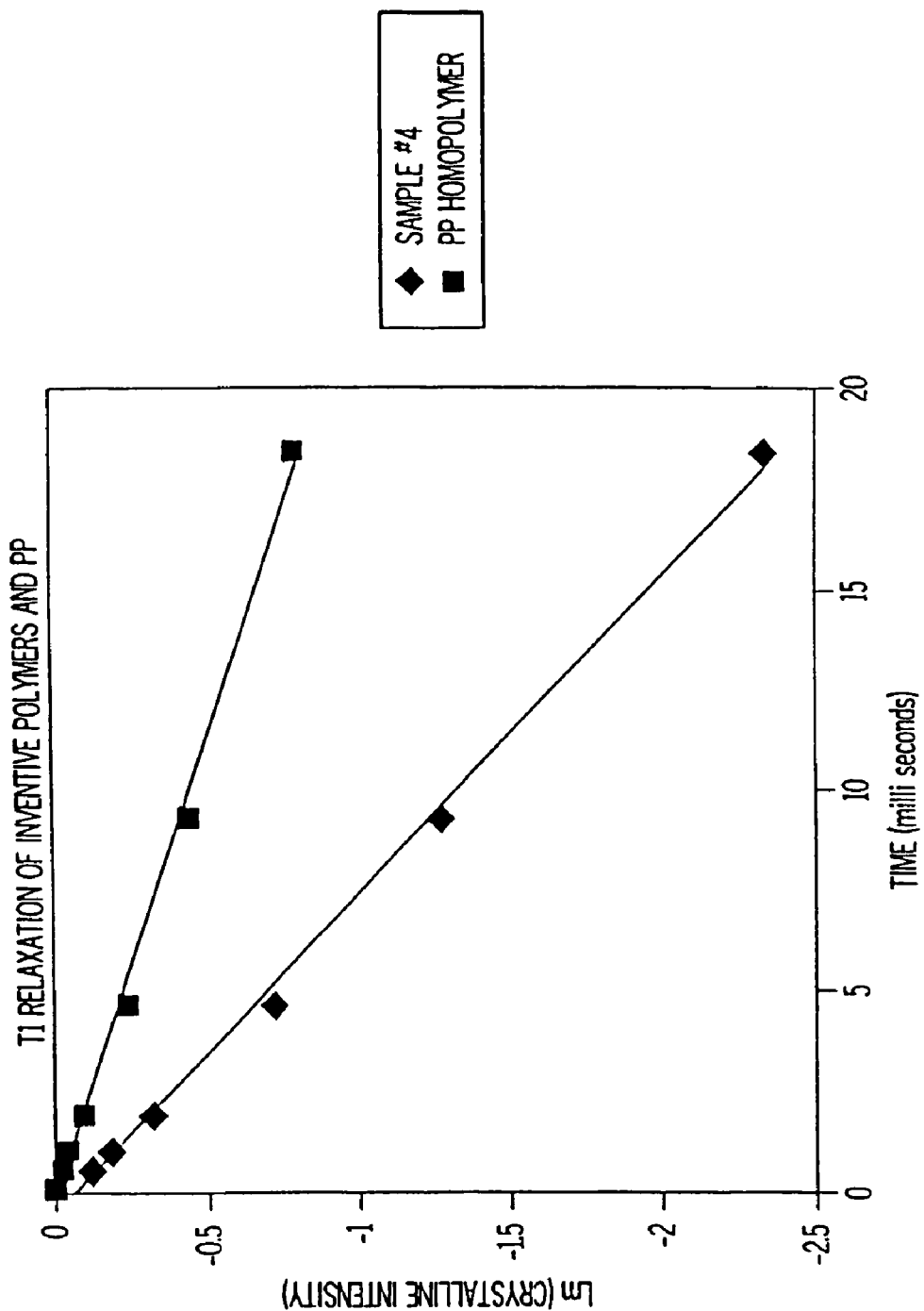
FIG. 1 is a plot of the natural log of crystalline intensity (by $^1$H NMR) versus time in milliseconds; $T_{1\rho}$ referred to in this description is the slope of the line.

We contemplate thermoplastic polymer compositions composed of a majority of propylene with a minor amount of ethylene. These polymer compositions include a linear, single homogeneous macromolecular copolymer structure. These polymers have limited crystallinity due to adjacent isotactic propylene units and have a melting point as described below. They are generally devoid of any substantial intermolecular heterogeneity in tacticity and comonomer composition, and are substantially free of diene. They are also devoid of any substantial heterogeneity in intramolecular composition distribution. In addition, these thermoplastic polymer compositions are unexpectedly soft and elastic. These thermoplastic polymer compositions can be blended with a second polymer component comprising a copolymer of propylene, and at least one other alpha-olefin having less than 6 carbon atoms, said second polymer component comprising crystallizable propylene sequence and at least 75% by weight propylene.

Copolymer

Monomers in the Copolymer

According to an embodiment of the present invention, the copolymer includes from a lower limit of 5% or 6% or 8% or 10% by weight ethylene-derived units to an upper limit of 20% or 25% by weight ethylene-derived units. These embodiments also will include propylene-derived units present in the copolymer in the range of from a lower limit of 75% or 80% by weight to an upper limit of 95% or 94% or 92% or 90% by weight. These percentages by weight are based on the total weight of the propylene and ethylene-derived units; i.e., based on the sum of weight percent propylene-derived units and weight percent ethylene-derived units being 100%. Within these ranges, these copolymers are mildly crystalline as measured by differential scanning calorimetry (DSC), and are exceptionally soft, while still retaining substantial tensile strength and elasticity. Elasticity, as defined in detail hereinbelow, is a dimensional recovery from elongation for these copolymers. At ethylene compositions lower than the above limits for the copolymer, such polymers are generally crystalline, similar to crystalline isotactic polypropylene, and while having excellent tensile strength, they do not have the favorable softness and elasticity. At ethylene compositions higher than the above limits for the copolymer component, the copolymer is substantially amorphous. While such a material of higher ethylene composition may be soft, these compositions are weak in tensile strength and poor in elasticity. In summary, such copolymers of embodiments of our invention exhibit the softness, tensile strength and elasticity characteristic of vulcanized rubbers, without vulcanization.

In embodiments of the present invention, we intend that the copolymers be substantially free of diene-derived units. Dienes are nonconjugated diolefins which may be incorporated in polymers to facilitate chemical crosslinking reactions. "Substantially free of diene" is defined to be less than 1% diene, or less than 0.5% diene, or less than 0.1% diene, or less than 0.05% diene, or equal to 0%. All of these percentages are by weight in the copolymer. The presence or absence of diene can be conventionally determined by infrared techniques well known to those skilled in the art.

Sources of diene include diene monomer added to the polymerization of ethylene and propylene, or use of diene in catalysts. No matter the source of such dienes, the above outlined limits on their inclusion in the copolymer are contemplated. Conjugated diene-containing metallocene catalysts have been suggested for the formation of copolymers of olefins. However, polymers made from such catalysts will incorporate the diene from the catalyst, consistent with the incorporation of other monomers in the polymerization.

Molecular Weight and Polydispersity Index

Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287–368; Rodriguez, F., *Principles of Polymer Systems* 3rd ed., Hemisphere Pub. Corp., NY, (1989) 155–160; U.S. Pat. No. 4,540,753; Verstrate et al., *Macromolecules*, vol. 21, (1988) 3360; and references cited therein.

In embodiments of our invention, a copolymer is included having a weight average molecular weight (Mw) of from 15,000–5,000,000, or from 20,000 to 1,000,000 and a molecular weight distribution Mw/Mn (sometimes referred to as a "polydispersity index" (PDI)) ranging from a lower limit of 1.5 or 1.8 to an upper limit of 40 or 20 or 10 or 5 or 3.

In the measurement of properties ascribed to polymers of embodiments of our invention, there is a substantial absence of a secondary or tertiary polymer or polymers to form a blend. By "substantial absence" we intend less than 10%, or less than 5%, or less than 2.5%, or less than 1%, or 0%, by weight.

Melting Point and Crystallinity

Figure 4:
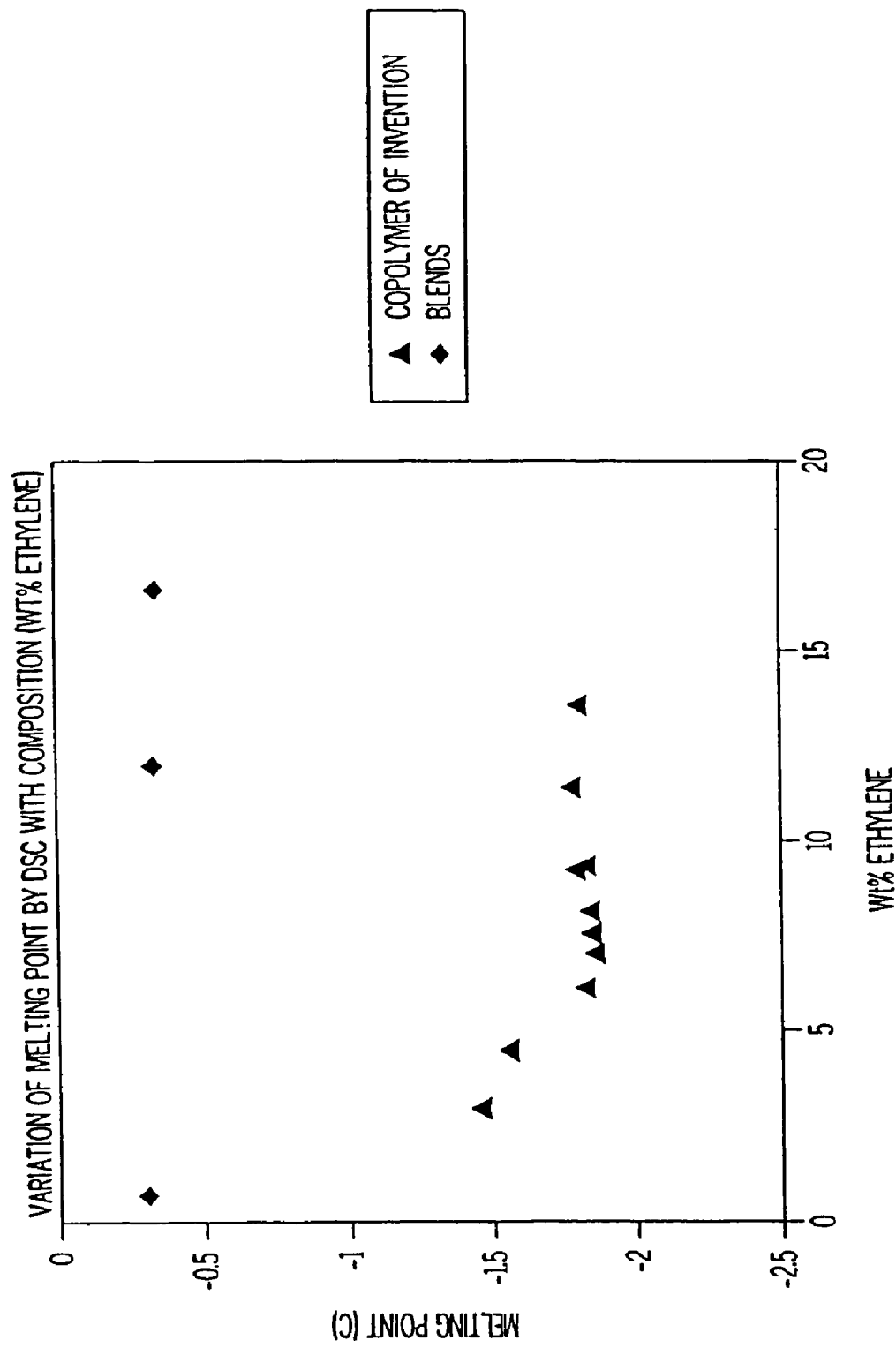
FIG. 4 is a plot of melting point (Tm) in ° C., as determined by DSC, versus percent ethylene of copolymers of the invention (triangle symbols) and blends of isotactic polypropylene with copolymers of the invention (diamond symbols).

The copolymer, according to an embodiment of our invention, has a single melting point. The copolymer can be a random copolymer of ethylene and propylene having a melting point (Tm) by Differential Scanning Calorimetry (DSC) ranging from an upper limit of less than 110° C., less than 90° C., less than 80° C., or less than 70° C.; to a lower limit of greater than 25° C., or greater than 35° C., or greater than 40° C. or greater than 45° C. FIG. 4 shows the melting point of propylene-ethylene copolymers of the invention as a function of ethylene weight percent, i.e., weight percent of ethylene-derived units (triangle symbols). For comparison, the diamond symbols in FIG. 4 show the melting point of blends of isotactic polypropylene and the inventive copolymers also as a function of weight percent ethylene. FIG. 4 clearly shows that copolymers of the present invention have a lower melting point than propylene-ethylene copolymer/isotactic polypropylene blends having the same weight percent ethylene.

Embodiments of our invention include copolymers having a heat of fusion, as determined by DSC, ranging from a lower limit of greater than 1.0 J/g, or greater than 1.5 J/g, or greater than 4.0 J/g, or greater than 6.0 J/g, or greater than 7.0 J/g, to an upper limit of less than 125 J/g, or less than 100 J/g, or less than 75 J/g, or less than 60 J/g, or less than 50 J/g, or less than 40 J/g, or less than 30 J/g. Without wishing to be bound by theory, we believe that the copolymers of embodiments of our invention have generally isotactic crystallizable propylene sequences, and the above heats of fusion are believed to be due to the melting of these crystalline segments.

Tacticity Index

The tacticity index, expressed herein as "m/r", is determined by $^{13}C$ nuclear magnetic resonance (NMR). The tacticity index m/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50. Copolymers of embodiments of our invention can have a tacticity index m/r ranging from a lower limit of 4 or 6 to an upper limit of 8 or 10 or 12.

Triad Tacticity

An ancillary procedure for the description of the tacticity of the propylene units of embodiments of the current invention is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers of the present invention as the ratio of the number of units of the specified tacticity to all of the propylene triads in the copolymer.

The triad tacticity (mm fraction) of a propylene copolymer can be determined from a $^{13}$C NMR spectrum of the propylene copolymer and the following formula:

$$\text{mm Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

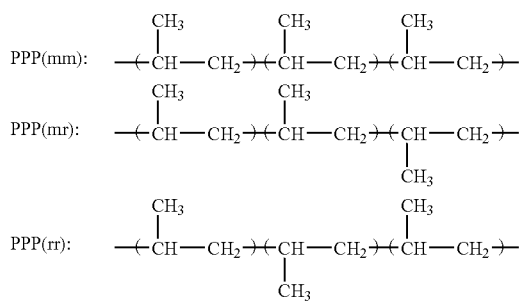

The $^{13}$C NMR spectrum of the propylene copolymer is measured as described in U.S. Pat. No. 5,504,172. The spectrum relating to the methyl carbon region (19–23 parts per million (ppm)) can be divided into a first region (21.2–21.9 ppm), a second region (20.3–21.0 ppm) and a third region (19.5–20.3 ppm). Each peak in the spectrum was assigned with reference to an article in the journal *Polymer*, Volume 30 (1989), page 1350.

In the first region, the methyl group of the second unit in the three propylene unit chain represented by PPP (mm) resonates.

In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm).

In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

Calculation of the Triad Tacticity and Errors in Propylene Insertion

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The propylene copolymers of embodiments of our invention have a triad tacticity of three propylene units, as measured by $^{13}$C NMR, of greater than 75%, or greater than 80%, or greater than 82%, or greater than 85%, or greater than 90%.

Stereo- and Regio-errors in Insertion of Propylene: 2,1 and 1,3 Insertions

The insertion of propylene can occur to a small extent by either 2,1 (tail to tail) or 1,3 insertions (end to end). Examples of 2,1 insertion are shown in structures 1 and 2 below.

Structure (1):

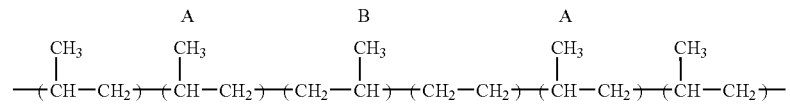

Structure (2):

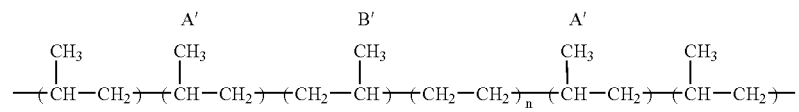

where $n \geq 2$.

A peak of the carbon A and a peak of the carbon A' appear in the second region. A peak of the carbon B and a peak of the carbon B' appear in the third region, as described above. Among the peaks which appear in the first to third regions, peaks which are not based on the 3 propylene unit chain consisting of head-to-tail bonds are peaks based on the PPE-methyl group, the EPE-methyl group, the carbon A, the carbon A', the carbon B, and the carbon B'.

The peak area based on the PPE-methyl group can be evaluated by the peak area of the PPE-methine group (resonance in the vicinity of 30.8 ppm), and the peak area based on the EPE-methyl group can be evaluated by the peak area of the EPE-methine group (resonance in the vicinity of 33.1 ppm). The peak area based on the carbon A can be evaluated by twice as much as the peak area of the methine carbon (resonance in the vicinity of 33.9 ppm) to which the methyl group of the carbon B is directly bonded; and the peak area based on the carbon A' can be evaluated by the peak area of the adjacent methine carbon (resonance in the vicinity of 33.6 ppm) of the methyl group of the carbon B'. The peak area based on the carbon B can be evaluated by the peak area of the adjacent methine carbon (resonance in the vicinity of 33.9 ppm); and the peak area based on the carbon B' can be also evaluated by the adjacent methine carbon (resonance in the vicinity of 33.6 ppm).

By subtracting these peak areas from the total peak areas of the second region and the third region, the peak areas based on the three propylene unit chains (PPP(mr) and PPP(rr)) consisting of head-to-tail bonds can be obtained. Thus, the peak areas of PPP(mm), PPP(mr) and PPP(rr) can be evaluated, and the triad tacticity of the propylene unit chain consisting of head-to-tail bonds can be determined.

The proportion of the 2,1-insertions to all of the propylene insertions in a propylene elastomer was calculated by the following formula with reference to article in the journal *Polymer*, vol. 30 (1989), p. 1350.

$$\frac{0.25 I\alpha\beta(\text{structure}(i)) + 0.5 I\alpha\beta(\text{structure}(ii))}{I\alpha\alpha + I\alpha\beta(\text{structure}(ii)) + 0.5(I\alpha\gamma + I\alpha\beta(\text{structure}(i)) + I\alpha\delta)} \times 100$$

Proportion of inversely inserted unit based on 2,1-insertion (%)=Naming of the peaks in the above formula was made in accordance with a method by Carman, et al. in the journal *Rubber Chemistry and Technology*, volume 44 (1971), page 781, where $I_{\alpha\delta}$ denotes a peak area of the $\alpha\delta^+$ secondary carbon peak. It is difficult to separate the peak area of $I\alpha\beta$ (structure (i)) from $I\alpha\beta$ (structure (ii)) because of overlapping of the peaks. Carbon peaks having the corresponding areas can be substituted therefor.

The measurement of the 1,3 insertion requires the measurement of the βγ peak. Two structures can contribute to the βγ peak: (1) a 1,3 insertion of a propylene monomer; and (2) from a 2,1-insertion of a propylene monomer followed by two ethylene monomers. This peak is described as the 1.3 insertion peak and we use the procedure described in U.S. Pat. No. 5,504,172, which describes this βγ peak and understand it to represent a sequence of four methylene units. The proportion (%) of the amount of these errors was determined by dividing the area of the βγ peak (resonance in the vicinity of 27.4 ppm) by the sum of all the methyl group peaks and ½ of the area of the βγ peak, and then multiplying the resulting value by 100. If an α-olefin of three or more carbon atoms is polymerized using an olefin polymerization catalyst, a number of inversely inserted monomer units are present in the molecules of the resultant olefin polymer. In polyolefins prepared by polymerization of α-olefins of three or more carbon atoms in the presence of a chiral metallocene catalyst, 2,1-insertion or 1,3-insertion takes place in addition to the usual 1,2-insertion, such that inversely inserted units such as a 2,1-insertion or a 1,3-insertion are formed in the olefin polymer molecule (see, *Macromolecular Chemistry Rapid Communication*, Volume 8, page 305 (1987), by K. Soga, T. Shiono, S. Takemura and W. Kaminski).

The proportion of inversely inserted propylene units of embodiments of our invention, based on the 2,1-insertion of a propylene monomer in all propylene insertions, as measured by $^{13}$C NMR, is greater than 0.5%, or greater than 0.6%.

The proportion of inversely inserted propylene units of embodiments of our invention, based on the 1,3-insertion of a propylene monomer, as measured by $^{13}$C NMR, is greater than 0.05%, or greater than 0.06%, or greater than 0.07%, or greater than 0.08%, or greater than 0.085 percent.

Molecular Structure

Homogeneous Distribution

Homogeneous distribution is defined as a statistically insignificant intermolecular difference of both in the composition of the copolymer and in the tacticity of the polymerized propylene. For a copolymer to have a homogeneous distribution it must meet the requirement of two independent tests: (i) intermolecular distribution of tacticity; and (ii) intermolecular distribution of composition, which are described below. These tests are a measure of the statistically insignificant intermolecular differences of tacticity of the polymerized propylene and the composition of the copolymer, respectively.

Intermolecular Distribution of Tacticity

The copolymer of embodiments of our invention has a statistically insignificant intermolecular difference of tacticity of polymerized propylene between different chains (intermolecularly.). This is determined by thermal fractionation by controlled dissolution generally in a single solvent, at a series of slowly elevated temperatures. A typical solvent is a saturated hydrocarbon such as hexane or heptane. These controlled dissolution procedures are commonly used to separate similar polymers of different crystallinity due to differences in isotactic propylene sequences, as shown in the article in *Macromolecules*, Vol. 26, p 2064 (1993). For the copolymers of embodiments of our invention where the tacticity of the propylene units determines the extent of crystallinity, we expected this fractionation procedure will separate the molecules according to tacticity of the incorporated propylene. This procedure is described below.

In embodiments of our invention, at least 75% by weight, or at least 80% by weight, or at least 85% by weight, or at least 90% by weight, or at least 95% by weight, or at least 97% by weight, or at least 99% by weight of the copolymer is soluble in a single temperature fraction, or in two adjacent temperature fractions, with the balance of the copolymer in immediately preceding or succeeding temperature fractions. These percentages are fractions, for instance in hexane, beginning at 23° C. and the subsequent fractions are in approximately 8° C. increments above 23° C. Meeting such a fractionation requirement means that a polymer has statistically insignificant intermolecular differences of tacticity of the polymerized propylene.

Fractionations have been done where boiling pentane, hexane, heptane and even di-ethyl ether are used for the fractionation. In such boiling solvent fractionations, polymers of embodiments of our invention will be totally soluble in each of the solvents, offering no analytical information. For this reason, we have chosen to do the fractionation as referred to above and as detailed herein, to find a point within these traditional fractionations to more fully describe our polymer and the surprising and unexpected insignificant intermolecular differences of tacticity of the polymerized propylene.

Intermolecular Distribution of Composition

The copolymer of embodiments of our invention has statistically insignificant intermolecular differences of composition, which is the ratio of propylene to ethylene between different chains (intermolecular). This compositional analysis is by infrared spectroscopy of the fractions of the polymer obtained by the controlled thermal dissolution procedure described above.

A measure of the statistically insignificant intermolecular differences of composition, each of these fractions has a composition (wt. % ethylene content) with a difference of less than 1.5 wt. % (absolute) or less than 1.0 wt. % (absolute), or less than 0.8 wt. % (absolute) of the average wt. % ethylene content of the whole copolymer. Meeting such a fractionation requirement means that a polymer has statistically insignificant intermolecular differences of composition, which is the ratio of propylene to ethylene.

Uniformity

Uniformity is defined to be a statistically insignificant intramolecular difference of both the composition of the copolymer and in the tacticity of the polymerized propylene. For a copolymer to be uniform it must meet the requirement of two independent tests: (i) intramolecular distribution of tacticity; and (ii) intramolecular distribution of composition, which are described below. These tests are a measure of the statistically insignificant intramolecular differences of tacticity of the polymerized propylene and the composition of the copolymer, respectively.

Intramolecular Distribution of Composition

The copolymer of embodiments of our invention has statistically insignificant intramolecular differences of composition, which is the ratio of propylene to ethylene along the segments of the same chain (intramolecular). This compositional analysis is inferred from the process used for the synthesis of these copolymers as well as the results of the sequence distribution analysis of the copolymer, for molecular weights in the range of from 15,000–5,000,000 or 20,000–1,000,000.

Process

The polymerization process is a single stage, steady state, polymerization conducted in a well-mixed continuous feed polymerization reactor. The polymerization can be conducted in solution, although other polymerization procedures such as gas phase or slurry polymerization, which fulfill the requirements of single stage polymerization and continuous feed reactors, are contemplated.

The process can be described as a continuous, non-batch process that, in its steady state operation, is exemplified by removal of amounts of polymer made per unit time, being substantially equal to the amount of polymer withdrawn from the reaction vessel per unit time. By "substantially equal" we intend that these amounts, polymer made per unit time, and polymer withdrawn per unit time, are in ratios of one to other, of from 0.9:1; or 0.95:1; or 0.97:1; or 1:1. In such a reactor, there will be a substantially homogeneous monomer distribution. At the same time, the polymerization is accomplished in substantially single step or stage or in a single reactor, contrasted to multistage or multiple reactors (two or more). These conditions exist for substantially all of the time the copolymer is produced.

Monomer Sequence Distribution

One method to describe the molecular features of an ethylene-propylene copolymer is monomer sequence distribution. Starting with a polymer having a known average composition, the monomer sequence distribution can be determined using spectroscopic analysis. Carbon 13 nuclear magnetic resonance spectroscopy ($^{13}C$ NMR) can be used for this purpose, and can be used to establish diad and triad distribution via the integration of spectral peaks. (If $^{13}C$ NMR is not used for this analysis, substantially lower $r_1 r_2$ products are normally obtained.) The reactivity ratio product is described more fully in *Textbook of Polymer Chemistry*, F. W. Billmeyer, Jr., Interscience Publishers, New York, p. 221 et seq. (1957).

The reactivity ratio product $r_1 r_2$, where $r_1$ is the reactivity of ethylene and $r_2$ is the reactivity of propylene, can be calculated from the measured diad distribution (PP, EE, EP and PE in this nomenclature) by the application of the following formulae:

$$r_1 r_2 = 4(EE)(PP)/(EP)^2$$

$$r_1 = K_{11}/K_{12} = [2(EE)/EP]X$$

$$r_2 = K_{22}/K_{21} = [2(PP)/(EP)]X$$

$$P = (PP) + (EP/2)$$

$$E = (EE) + (EP/2)$$

where $$\text{Mol \% } E = [(E)/(E+P)] * 100$$

$$X = E/P \text{ in reactor;}$$

$K_{11}$ and $K_{12}$ are kinetic insertion constants for ethylene; and $K_{21}$ and $K_{22}$ are kinetic insertion constants for propylene.

As is known to those skilled in the art, a reactivity ratio product $r_1 r_2$ of 0 can define an "alternating" copolymer, and a reactivity ratio product of 1 is said to define a "statistically random" copolymer. In other words, a copolymer having a reactivity ratio product $r_1 r_2$ of between 0.6 and 1.5 is generally said to be random (in strict theoretical terms, generally only a copolymer having a reactivity ratio product $r_1 r_2$ greater than 1.5 contains relatively long homopolymer sequences and is said to be "blocky"). The copolymer of our invention will have a reactivity ratio product $r_1 r_2$ of less than 1.5, or less than 1.3, or less than 1.0, or less than 0.8. The substantially uniform distribution of comonomer within polymer chains of embodiments of our invention generally precludes the possibility of significant amounts of propylene units or sequences within the polymer chain for the molecular weights (weight average) disclosed herein.

Intramolecular Distribution of Tacticity

The copolymer of embodiments of our invention has statistically insignificant intramolecular differences of tacticity, which is due to isotactic orientation of the propylene units along the segments of the same chain (intramolecular). This compositional analysis is inferred from the detailed analysis of the differential scanning calorimetry, electron microscopy and relaxation measurement ($T_{1\rho}$). In the presence of significant intramolecular differences in tacticity, we would form 'stereoblock' structures, where the number of isotactic propylene residues adjacent to one another is much greater than statistical. Further, the melting point of these polymers depends on the crystallinity, since the more blocky polymers should have a higher melting point as well as depressed solubility in room temperature solvents.

$T_{1\rho}$: Solid-state $^1H$ NMR $T_{1\rho}$ Relaxation Time

The principle of solid state proton NMR relaxation time ($^1H$ NMR $T_{1\rho}$) and its relationship with polymer morphology have been discussed in *Macromolecules* 32 (1999), 1611. The experimental $T_{1\rho}$ relaxation data of embodiments of the current invention, and polypropylene (PP) homopolymer (control sample) are shown in FIG. 1, which plots the natural log of the crystalline intensity versus time; the experimental procedure for collecting these data is described below. To fit the data with single exponential function, linear regression was performed on the ln(I) vs. t data, where I is the intensity of the crystalline signal. Then, the quality of the fit, $R^2$, is calculated. The $R^2$ for a perfect linear correlation is 1.0. The $R^2$ for polypropylene (control) and a copolymer of the current invention (shown in FIG. 1) are 0.9945 and 0.9967, respectively. Therefore, the $T_{1\rho}$ relaxation for both polypropylene homopolymer and a copolymer of the current invention can be well fitted by a single-exponential. From the fit, the $T_{1\rho}$ of polypropylene and a copolymer of the present invention, are calculated as 25 milliseconds (ms) and 8.7 ms, respectively. The large difference in the $T_{1\rho}$ is reflective of their difference in morphology.

The hypothetical polypropylene-like regions would have $T_{1\rho}$ relaxation similar to that in polypropylene homopolymer. As a result, should such regions exist in embodiments of the invention, the $T_{1\rho}$ relaxation would contain a component that has a $T_{1\rho}$ relaxation time characteristic of polypropylene homopolymer (i.e., $T_{1\rho}$=25 ms). As seen in FIG. 1, the $T_{1\rho}$ relaxation of the current invention can only be well fitted by a single exponential. Incorporation of a component whose $T_{1\rho}$=25 ms would deteriorate the fit. This demonstrates that the polymers of the current invention do not contain long continuous isotactic propylene units. In embodiments of our invention, the $T_{1\rho}$, relaxation time can be less than 18 ms, or less than 16 ms, or less than 14 ms, or less than 12 ms, or less than 10 ms.

$T_{1\rho}$ Measurement.

The experiments are performed on a Bruker DSX-500 Nuclear Magnetic Resonance (NMR) spectrometer, with a $^1$H frequency of 500.13 MHz and $^{13}$C frequency of 125.75 MHz. The pulse sequence was a 90° ($^1$H) pulse followed by spin lock and cross polarization ("CP"; time=0.1 ms). A spin lock field strength of $\gamma B_1$=2π*60 kHz is used. After the spin lock, the magnetization is transferred to $^{13}$C by CP and then the signal is detected. The crystalline methine signal at 26.7 ppm is recorded and normalized and its natural logarithm (Ln) is plotted against spin lock time in FIG. 1. Measurements were made on a polypropylene homopolymer sample, and on a polymer of the present invention, labeled "Sample 4" and described in the Examples below. Table 1 presents the data.

TABLE 1

| Time (ms) | Ln(I) (sample 4) | Ln(I) (PP) |
|---|---|---|
| 0.02 | 0 | 0 |
| 0.5 | −0.11394 | −0.02496 |
| 1 | −0.18772 | −0.04733 |
| 2 | −0.32424 | −0.09871 |
| 5 | −0.71649 | −0.24692 |
| 10 | −1.27022 | −0.44715 |
| 20 | −2.34181 | −0.79526 |

Catalysts and Activators for Copolymer Production

Catalysts

A typical isotactic polymerization process consists of a polymerization in the presence of a catalyst including a bis(cyclopentadienyl) metal compound and either (1) a non-coordinating compatible anion activator, or (2) an alumoxane activator. According to one embodiment of the invention, this process comprises the steps of contacting ethylene and propylene with a catalyst in a suitable polymerization diluent, the catalyst including, in one embodiment, a chiral metallocene compound, e.g., a bis(cyclopentadienyl) metal compound as described in U.S. Pat. No. 5,198,401, and an activator. U.S. Pat. No. 5,391,629 also describes catalysts useful to produce the copolymers of our invention.

The catalyst system described below useful for making the copolymers of embodiments of our invention, is a metallocene with a non-coordinating anion (NCA) activator, and optionally a scavenging compound. Polymerization is conducted in a solution, slurry or gas phase. The polymerization can be performed in a single reactor process. A slurry or solution polymerization process can utilize sub- or superatmospheric pressures and temperatures in the range of from −25° C. to 110° C. In a slurry polymerization, a suspension of solid, particulate polymer is formed in a liquid polymerization medium to which ethylene, propylene, hydrogen and catalyst are added. In solution polymerization, the liquid medium serves as a solvent for the polymer. The liquid employed as the polymerization medium can be an alkane or a cycloalkane, such as butane, pentane, hexane, or cyclohexane, or an aromatic hydrocarbon, such as toluene, ethylbenzene or xylene. For slurry polymerization, liquid monomer can also be used. The medium employed should be liquid under the conditions of the polymerization and relatively inert. Hexane or toluene can be employed for solution polymerization. Gas phase polymerization processes are described in U.S. Pat. Nos. 4,543,399, 4,588,790, 5,028,670, for example. The catalyst can be supported on any suitable particulate material or porous carrier, such as polymeric supports or inorganic oxides, such as, for example silica, alumina or both. Methods of supporting metallocene catalysts are described in U.S. Pat. Nos. 4,808,561, 4,897, 455, 4,937,301, 4,937,217, 4,912,075, 5,008,228, 5,086,025, 5,147,949, and 5,238,892.

Propylene and ethylene are the monomers that can be used to make the copolymers of embodiments of our invention, but optionally, ethylene can be replaced or added to in such polymers with a C4 to C20 α-olefin, such as, for example, 1-butene, 4-methyl-1-pentene, 1-hexene or 1-octene.

Metallocene

The terms "metallocene" and "metallocene catalyst precursor" are terms known in the art to mean compounds possessing a Group 4, 5, or 6 transition metal M, with a cyclopentadienyl (Cp) ligand or ligands which may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable cocatalyst (sometimes referred to as an activator) in order to yield an active metallocene catalyst, i.e., an organometallic complex with a vacant coordination site that can coordinate, insert, and polymerize olefins.

Preferred metallocenes are cyclopentadienyl complexes which have two Cp ring systems as ligands. The Cp ligands preferably form a bent sandwich complex with the metal, and are preferably locked into a rigid configuration through a bridging group. These cyclopentadienyl complexes have the general formula:

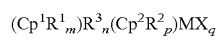

wherein Cp$^1$ and Cp$^2$ are preferably the same; R$^1$ and R$^2$ are each, independently, a halogen or a hydrocarbyl, halocarbyl, hydrocarbyl-substituted organometalloid or halocarbyl-substituted organometalloid group containing up to 20 carbon atoms; m is preferably 1 to 5; p is preferably 1 to 5; preferably two R$^1$ and/or R$^2$ substituents on adjacent carbon atoms of the cyclopentadienyl ring associated therewith can be joined together to form a ring containing from 4 to 20 carbon atoms; R$^3$ is a bridging group; n is the number of atoms in the direct chain between the two ligands and is preferably 1 to 8, most preferably 1 to 3; M is a transition metal having a valence of from 3 to 6, preferably from group 4, 5, or 6 of the periodic table of the elements, and is preferably in its highest oxidation state; each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2.

Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614.

Illustrative, but not limiting examples of preferred biscyclopentadienyl metallocenes of the type described above are the racemic isomers of:

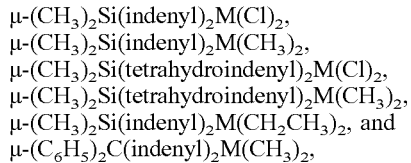

μ-(CH$_3$)$_2$Si(indenyl)$_2$M(Cl)$_2$,
μ-(CH$_3$)$_2$Si(indenyl)$_2$M(CH$_3$)$_2$,
μ-(CH$_3$)$_2$Si(tetrahydroindenyl)$_2$M(Cl)$_2$,
μ-(CH$_3$)$_2$Si(tetrahydroindenyl)$_2$M(CH$_3$)$_2$,
μ-(CH$_3$)$_2$Si(indenyl)$_2$M(CH$_2$CH$_3$)$_2$, and
μ-(C$_6$H$_5$)$_2$C(indenyl)$_2$M(CH$_3$)$_2$, wherein M is Zr, Hf, or Ti.

Non-coordinating Anions

As already mentioned, the metallocene or precursor are activated with a non-coordinating anion. The term "non-coordinating anion" means an anion which either does not coordinate to the transition metal cation or which is only weakly coordinated to the cation, thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those which are compatible, stabilize the metallocene cation in the sense of balancing its ionic charge, yet retain sufficient lability to permit displacement by an ethylenically or acetylenically unsaturated monomer during polymerization. Additionally, the anions useful in this invention may be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to 4 angstroms.

Descriptions of ionic catalysts for coordination polymerization including metallocene cations activated by non-coordinating anions appear in the early work in EP-A-0 277 003, EP-A-0 277 004, U.S. Pat. Nos. 5,198,401 and 5,278,119, and WO 92/00333. These references suggest a method of preparation wherein metallocenes (bis Cp and mono Cp) are protonated by anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a non-coordinating anion is also known. See, EP-A-0 426 637, EP-A-0 573 403 and U.S. Pat. No. 5,387,568. Reactive cations other than Bronsted acids capable of ionizing the metallocene compounds include ferrocenium, triphenylcarbonium, and triethylsilylium cations. Any metal or metalloid capable of forming a coordination complex which is resistant to degradation by water (or other Bronsted or Lewis acids) may be used or contained in the anion of the second activator compound. Suitable metals include, but are not limited to, aluminum, gold, platinum and the like. Suitable metalloids include, but are not limited to, boron, phosphorus, silicon and the like.

An additional method of making the ionic catalysts uses ionizing anionic pre-cursors which are initially neutral Lewis acids but form the cation and anion upon ionizing reaction with the metallocene compounds. For example tris(pentafluorophenyl) boron acts to abstract an alkyl, hydride or silyl ligand to yield a metallocene cation and stabilizing non-coordinating anion; see EP-A-0 427 697 and EP-A-0 520 732. Ionic catalysts for addition polymerization can also be prepared by oxidation of the metal centers of transition metal compounds by anionic precursors containing metallic oxidizing groups along with the anion groups; see EP-A-0 495 375.

Illustrative, but not limiting, examples of suitable activators capable of ionic cationization of the metallocene compounds of the invention, and consequent stabilization with a resulting non-coordinating anion, include:

trialkyl-substituted ammonium salts such as:
triethylammonium tetraphenylborate;
tripropylammonium tetraphenylborate;
tri(n-butyl)ammonium tetraphenylborate;
trimethylammonium tetrakis(p-tolyl)borate;
trimethylammonium tetrakis(o-tolyl)borate;
tributylammonium tetrakis(pentafluorophenyl)borate;
tripropylammonium tetrakis(o,p-dimethylphenyl)borate;
tributylammonium tetrakis(m,m-dimethylphenyl)borate;
tributylammonium tetrakis(p-trifluoromethylphenyl)borate;
tributylammonium tetrakis(pentafluorophenyl)borate;
tri(n-butyl)ammonium tetrakis(o-tolyl)borate and the like;
N,N-dialkyl anilinium salts such as:
N,N-dimethylanilinium tetrakis(pentafluorophenyl)borate;
N,N-dimethylanilinium tetrakis(heptafluoronaphthyl)borate;
N,N-dimethylanilinium tetrakis(perfluoro-4-biphenyl)borate;
N,N-dimethylanilinium tetraphenylborate;
N,N-diethylanilinium tetraphenylborate;
N,N-2,4,6-pentamethylanilinium tetraphenylborate and the like;
dialkyl ammonium salts such as:
di-(isopropyl)ammonium tetrakis(pentafluorophenyl)borate;
dicyclohexylammonium tetraphenylborate and the like; and
triaryl phosphonium salts such as:
triphenylphosphonium tetraphenylborate;
tri(methylphenyl)phosphonium tetraphenylborate;

tri(dimethylphenyl)phosphonium tetraphenylborate and the like.

Further examples of suitable anionic precursors include those comprising a stable carbonium ion, and a compatible non-coordinating anion. These include:

tropyllium tetrakis(pentafluorophenyl)borate;
triphenylmethylium tetrakis(pentafluorophenyl)borate;
benzene (diazonium) tetrakis(pentafluorophenyl)borate;
tropyllium phenyltris(pentafluorophenyl)borate;
triphenylmethylium phenyl-(trispentafluorophenyl)borate;
benzene (diazonium) phenyl-tris(pentafluorophenyl)borate;
tropyllium tetrakis(2,3,5,6-tetrafluorophenyl)borate;
triphenylmethylium tetrakis(2,3,5,6-tetrafluorophenyl)borate;
benzene (diazonium) tetrakis(3,4,5-trifluorophenyl)borate;
tropyllium tetrakis(3,4,5-trifluorophenyl)borate;
benzene (diazonium) tetrakis(3,4,5-trifluorophenyl)borate;
tropyllium tetrakis(3,4,5-trifluorophenyl)aluminate;
triphenylmethylium tetrakis(3,4,5-trifluorophenyl)aluminate;
benzene (diazonium) tetrakis(3,4,5-trifluorophenyl)aluminate;
tropyllium tetrakis(1,2,2-trifluoroethenyl)borate;
triphenylmethylium tetrakis(1,2,2-trifluoroethenyl)borate;
benzene (diazonium) tetrakis(1,2,2-trifluoroethenyl)borate;
tropyllium tetrakis(2,3,4,5-tetrafluorophenyl)borate;
triphenylmethylium tetrakis(2,3,4,5-tetrafluorophenyl)borate;
benzene (diazonium) tetrakis(2,3,4,5-tetrafluorophenyl)borate, and the like.

A catalyst system of $\mu$-$(CH_3)_2$Si(indenyl)$_2$Hf$(CH_3)_2$ with a cocatalyst of N,N-dimethylanilinium tetrakis(pentafluorophenyl)borate, can be used.

Properties and Analysis of the Copolymer

Elongation and Tensile Strength

Elongation and tensile strength were measured as described below. The copolymers of the current invention have an elongation of greater than 1000%, or greater than 1200%, or greater than 1500%.

The copolymers of the current invention have a tensile strength greater than 300 psi (2.1 MPa), or greater than 500 psi (3.5 MPa) or greater than 1000 psi (6.9 MPa).

Tensile and elongation properties are determined at 20 in/min (51 cm/min) according to the procedure described in ASTM D790. The data is reported in engineering units with no correction to the stress for the lateral contraction in the specimen due to tensile elongation. The tensile and elongation properties of embodiments of our invention are evaluated using dumbbell-shaped samples. The samples are compression molded at 180° C. to 200° C. for 15 minutes at a force of 15 tons (133 kN) into a plaque of dimensions of 6 in×6 in (15 cm×15 cm). The cooled plaques are removed and the specimens are removed with a die. The elasticity evaluation of the samples is conducted on an Instron 4465, made by Instron Corporation of 100 Royall Street, Canton, Mass. The digital data is collected in a file collected by the Series IX Material Testing System available from Instron Corporation and analyzed using Excel 5, a spreadsheet program available from Microsoft Corporation of Redmond, Wash.

Elasticity

Embodiments of our invention are elastic after tensile deformation. The elasticity, represented by the fractional increase in the length of the sample, represented as percent of the length of the sample, is measured according to the general procedure ASTM D790. During tensile elongation, the copolymer sample is stretched, and the polymer attempts to recover its original dimensions when the stretching force is removed. This recovery is not complete, and the final length of the relaxed sample is slightly longer than that of the original sample. Elasticity is represented by the fractional increase in the length of the sample, expressed as a percent of the length of the original un-stretched sample.

The protocol for measuring the elasticity of the sample consists of prestretching the deformable zone of the dumbbell, made according to the procedure described above for the measurement of elongation and tensile strength, which is the narrow portion of the specimen, to 200% of its original length to prestretch the sample. This is conducted at a deformation rate of 10 inches (25 cm) per minute. The sample is relaxed at the same rate to form an analytical specimen which is a prestretched specimen of the original sample. This slightly oriented, or prestretched, sample is allowed to relax for 48 hours, at room temperature, prior to the determination of elasticity. The length of the deformation zone in the sample is measured to be $d_1$. After the 48 hours, it is again deformed at 10 inches per minute for a 200% extension of the deformation zone of the sample and allowed to relax at the same rate. The sample is removed and after 10 minutes of relaxation the sample is measured to have a new length of the deformation zone of $d_2$. The elasticity of the sample as a percent is determined as $100*(d_2-d_1)/d_1$.

Embodiments of the invention have elasticity, as measured by the procedure described above, of less than 30%, or less than 20%, or less than 10%, or less than 8% or less than 5%.

These values of the elasticity over the range of composition of the copolymer vary with the tensile strength of the sample as measured by the 500% tensile modulus. Elasticity of this family of copolymers is thus represented by two criteria: (a) extensibility to 500% elongation with a measurable modulus (500% tensile modulus) and (b) elasticity from an extension to 200% elongation on a slightly oriented sample as described above. First, the copolymer of embodiments of our invention should have a measurable tensile strength at 500% elongation (also known as 500% tensile modulus), of greater than 0.5 MPa, or greater than 0.75 MPa, or greater than 1.0 MPa, or greater than 2.0 MPa; and second, the copolymer should have the above-described elasticity.

Figure 3:
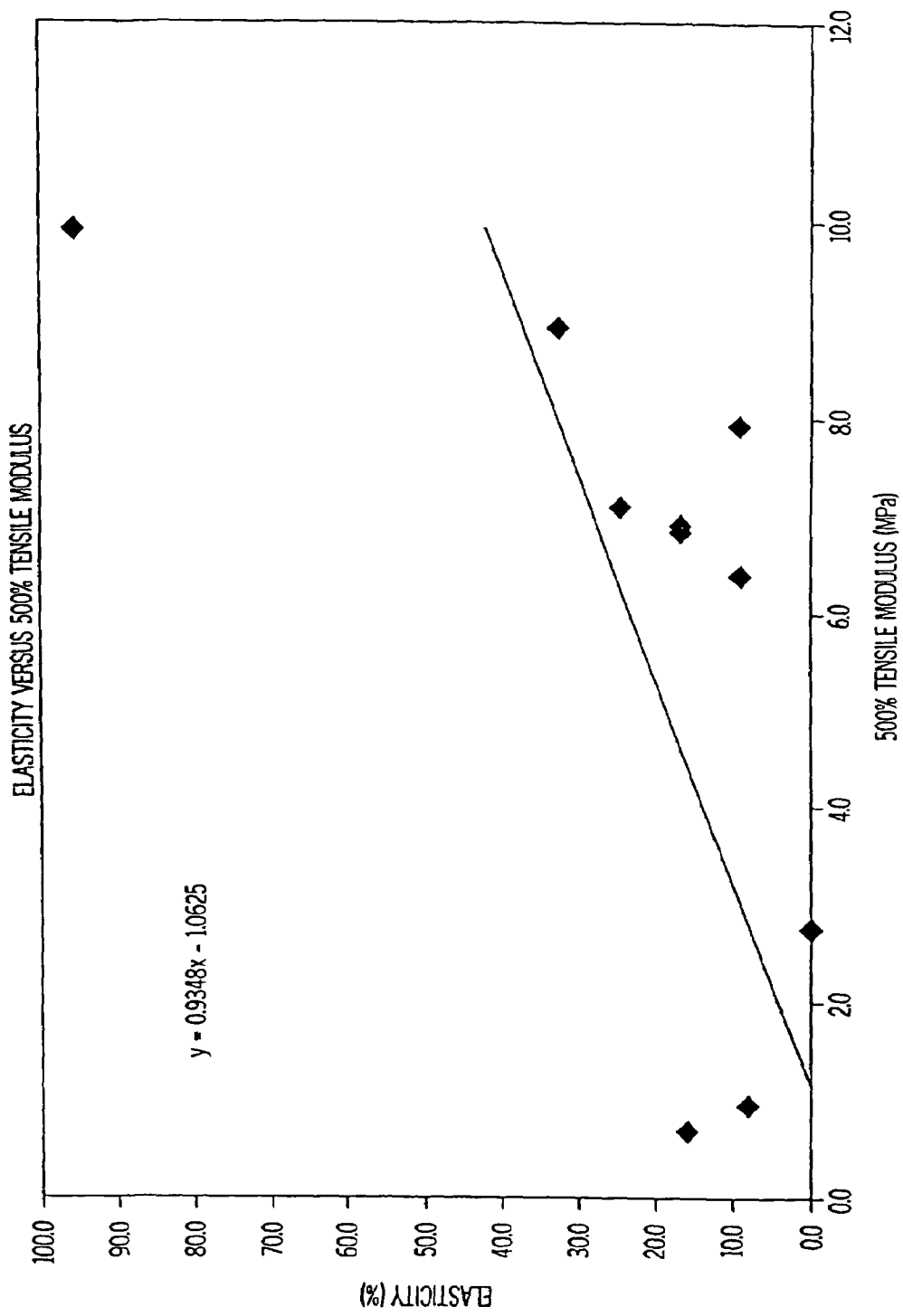
FIG. 3 is a plot of elasticity, in percent, versus 500% tensile modulus, in MPa.

Alternatively, the relationship of elasticity to 500% tensile modulus may be described. Referring to FIG. 3, elasticity is plotted versus 500% tensile modulus in MPa for copolymers of the invention. The plotted data correspond to Samples 5–14 in Table 6 of the Examples herein. A linear regression fit of the data yields a relationship of:

Elasticity (%)=0.9348$M$–1.0625 where M is the 500% tensile modulus in MPa. In embodiments of the present invention, the elasticity as a function of 500% tensile modulus in MPa is defined by:

Elasticity (%)≦0.935$M$+12; or

Elasticity (%)≦0.935$M$+6; or

Elasticity (%)≦0.935$M$.

Flexural Modulus

Softness of the copolymers of embodiments of the invention may be measured by flexural modulus. Flexural modulus is measured in accordance with ASTM D790, using a Type IV dogbone at crosshead speed of 0.05 in/min (1.3 mm/min). The values of the flexural modulus over the range of composition of the copolymer vary with the tensile strength of the sample as measured by the 500% tensile modulus. Flexural modulus of this family of copolymers is thus represented by two criteria: (a) extensibility to 500% elongation with a measurable modulus (500% tensile modulus); and (b) flexural modulus.

Figure 2:
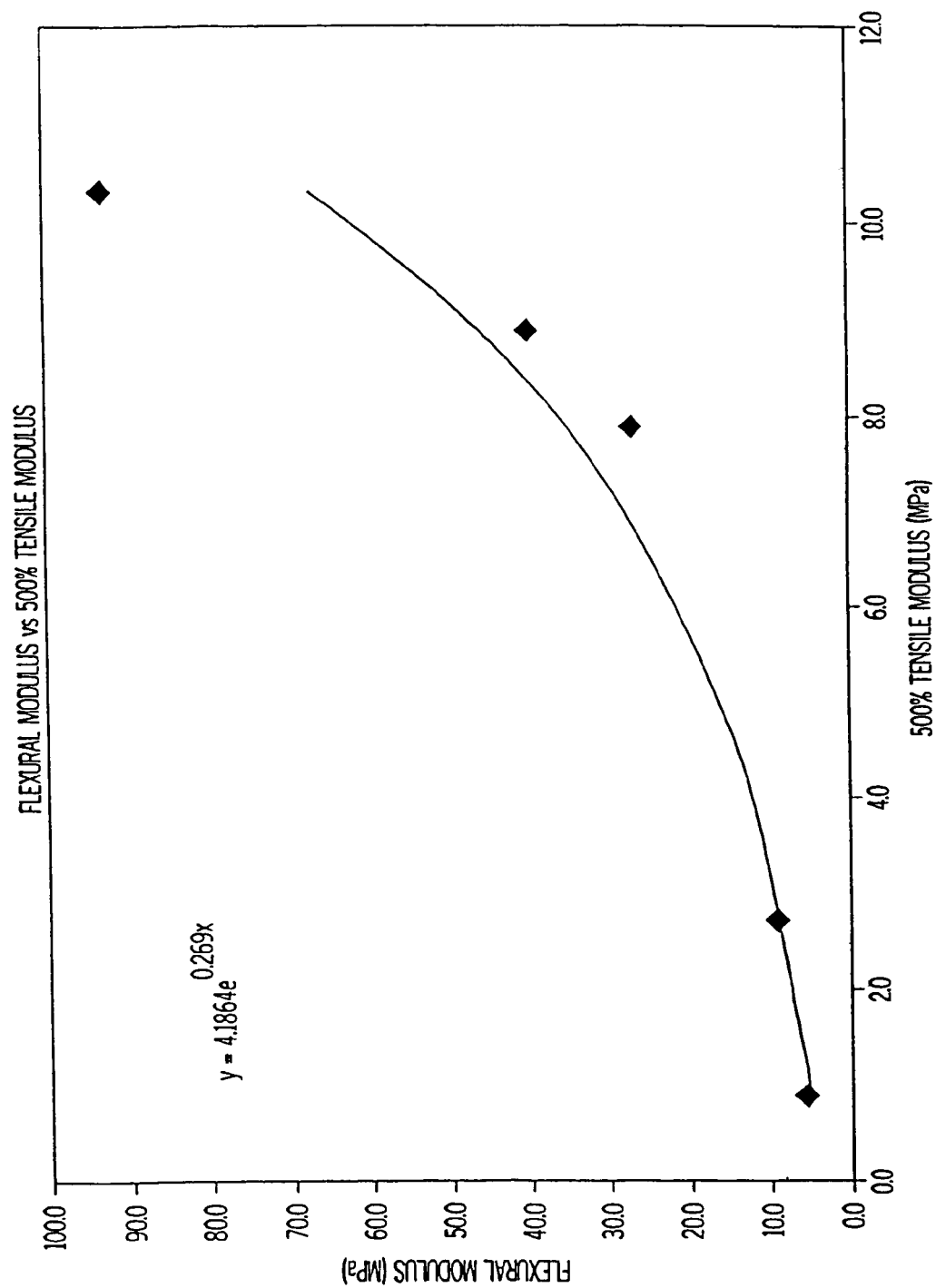
FIG. 2 is a plot of flexural modulus, in MPa, versus 500% tensile modulus, in MPa.

Referring to FIG. 2, flexural modulus in MPa is plotted versus 500% tensile modulus in MPa for copolymers of the invention. The plotted data correspond to Samples 15–19 in Table 7 of the Examples herein. A single exponential fit of the data yields a relationship of:

$$\text{Flexural Modulus (MPa)} = 4.1864 e^{0.0269M}$$

where M is the 500% tensile modulus in MPa. In embodiments of the present invention, the flexural modulus in MPa as a function of 500% tensile modulus in MPa is defined by:

$$\text{Flexural Modulus} \leq 4.2 e^{0.27M} + 50; \text{ or}$$

$$\text{Flexural Modulus} \leq 4.2 e^{0.27M} + 30; \text{ or}$$

$$\text{Flexural Modulus} \leq 4.2 e^{0.27M} + 10; \text{ or}$$

$$\text{Flexural Modulus} \leq 4.2 e^{0.27M} + 2.$$

Ethylene Composition

The composition of ethylene propylene copolymers is measured as ethylene wt. % according to ASTM D3900 as follows. A thin homogeneous film of the copolymer component, pressed at a temperature of at or greater than 150° C., is mounted on a Perkin Elmer PE 1760 infra red spectrophotometer. A full spectrum of the sample from 600 cm$^{-1}$ to 4000 cm$^{-1}$ is recorded, and the ethylene weight percent of the copolymer component is calculated from:

$$\text{Ethylene wt. \%} = 82.585 - 111.987X + 30.045X^2$$

where X is the ratio of the peak height at 1155 cm$^{-1}$ to peak height at either 722 cm$^{-1}$ or 732 cm$^{-1}$, which ever is higher.

Molecular Weight and PDI

Techniques for determining the molecular weight (Mn and Mw) and molecular weight distribution (MWD) are found in U.S. Pat. No. 4,540,753, and in *Macromolecules*, 1988, volume 21, p. 3360 (Verstrate et al).

Melting Point and Heat of Fusion

Melting point and heat of fusion are measured by Differential Scanning Calorimetry (DSC) follows. About 6 to 10 mg of a sheet of the polymer pressed at approximately 200° C. to 230° C. is removed with a punch die. This is annealed at room temperature for 24 hours. At the end of this period, the sample is placed in a Differential Scanning Calorimeter (Perkin Elmer 7 Series Thermal Analysis System) and cooled to about –50° C. to about –70° C. The sample is heated at 20° C./min to attain a final temperature of about 200° C. to about 220° C. The thermal output is recorded as the area under the melting peak of the sample, which is typically peaked at about 30° C. to about 175° C. and occurs between the temperatures of about 0° C. and about 200° C., and is measured in joules as a measure of the heat of fusion. The melting point is recorded as the temperature of the greatest heat absorption within the range of melting of the sample.

Intermolecular Composition and Tacticity Distribution Determination

Intermolecular composition distribution of the copolymer is measured as described below. Nominally 30 grams of the copolymer is cut into small cubes with about ⅛" (3 mm) sides. This is introduced into a thick-walled glass bottle with a screw cap closure, along with 50 mg of Irganox1076, an antioxidant commercially available from Ciba-Geigy Corporation. Then, 425 mL of hexane (a principal mixture of normal and iso isomers) is added to the bottle and the sealed bottle is maintained at 23° C. for 24 hours. At the end of this period, the solution is decanted and the residue is treated with additional hexane for an additional 24 hours. At the end of this period, the two hexane solutions are combined and evaporated to yield a residue of the polymer soluble at 23° C. To the residue is added sufficient hexane to bring the volume to 425 mL and the bottle is maintained at 31° C. for 24 hours in a covered circulating water bath. The soluble polymer is decanted and an additional amount of hexane is added for another 24 hours at 31° C. prior to decanting. In this manner, fractions of the copolymers soluble at 40° C., 48° C., 55° C. and 62° C. are obtained at temperature increases of approximately 8° C. between stages. Increases in temperature to 95° C. can be accommodated if heptane, instead of hexane, is used as the solvent for all temperatures above about 60° C. The soluble polymers are dried, weighed and analyzed for composition, as wt. % ethylene content, by the IR technique described above. Soluble fractions obtained in the adjacent temperature fractions are the adjacent fractions in the specification above.

Blends of the Ethylene Propylene Copolymer

Novel polymer blend compositions having surprising properties can be made by blending the propylene-ethylene copolymers described above, hereinafter sometimes referred to as the First Polymer Component (FPC), with another polymer, hereinafter referred to as the Second Polymer Component (SPC).

The Second Polymer Component (SPC)

The second polymer component of the polymer blend compositions of the present invention comprises a copolymer of propylene and another alpha-olefin having less than 6 carbon atoms, preferably ethylene. Optionally, the second component of the composition of the present invention may further comprise, in addition to the above mentioned, amounts of a diene. The second polymer component of the present inventive composition preferably, according to one embodiment, comprises a random copolymer having a narrow compositional distribution. While not meant to be limited thereby, it is believed that the narrow composition distribution of the second polymer component is important. The intermolecular composition distribution of the polymer is determined by thermal fractionation in a solvent. A typical solvent is a saturated hydrocarbon such as hexane or heptane. This thermal fractionation procedure is described below. Typically, approximately 75% by weight and more preferably 85% by weight of the polymer is isolated as a one or two adjacent, soluble fraction with the balance of the polymer in immediately preceding or succeeding fractions. Each of these fractions has a composition (wt % ethylene content) with a difference of no greater than 20 wt % (relative) and more preferably 10 wt % (relative) of the average wt % ethylene content of the whole second polymer component. The second polymer component is narrow in compositional distribution if it meets the fractionation test outlined above.

In all second polymer components, the number and distribution of ethylene residues is consistent with the random statistical polymerization of ethylene, propylene and optional amounts of diene. In stereoblock structures, the number of monomer residues of any one kind adjacent to one another is greater than predicted from a statistical distribution in random copolymers with a similar composition. Historical polymers with stereoblock structure have a distribution of ethylene residues consistent with these blocky structures rather than a random statistical distribution of the monomer residues in the polymer. The intramolecular composition distribution of the polymer may be determined by C-13 NMR which locates the ethylene residues in relation to the neighboring propylene residue. A more practical and consistent evaluation of the randomness of the distribution of the ethylene and propylene sequences may be obtained by the following consideration. We believe that the second polymer component is random in the distribution of ethylene and propylene sequences since (1) it is made with a single sited metallocene catalyst which allows only a single statistical mode of addition of ethylene and propylene and (2) it is made in a well mixed, continuous monomer feed stirred tank polymerization reactor which allows only a single polymerization environment for substantially all of the polymer chains of the second polymer component.

The second polymer component preferably, according to one embodiment of the invention, has a single melting point. The melting point is determined by DSC. Generally, the copolymer second component of the present invention has a melting point below the first polymer component of the blend typically between about 105° C. and 25° C. Preferably, the melting point of second polymer component is between about 90° C. and 25° C. Most preferably, according to one embodiment of the present invention, the melting point of the second polymer component of the composition of the present invention is between 90° C. and 40° C.

The second polymer component preferably has a narrow molecular weight distribution (MWD) between about 1.8 to about 5.0, with a MWD between about 2.0 to about 3.2 preferred.

The second polymer component of the present inventive composition comprises isotactically crystallizable alpha-olefin sequences, e.g., preferably propylene sequences (NMR). The crystallinity of the second polymer component is, preferably, according to one embodiment, from about 2% to about 65% of homoisotactic polypropylene, preferably between 5% to 40%, as measured by the heat of fusion of annealed samples of the polymer.

According to another embodiment of the present invention, the second polymer component of the composition comprises from about 5% to about 25% by weight alpha-olefin, preferably from about 6% to about 20% by weight alpha-olefin, and most preferably, it comprises from about 6% to about 18% by weight alpha-olefin and even more preferably between 10% to 16% by alpha-olefin. These composition ranges for the second polymer component are dictated by the object of the present invention. At alpha-olefin compositions lower than the above lower limits for the second polymer component, the blends of the first polymer component and second polymer component are hard and do not have the favorable elongation properties of the blends of the present invention. At alpha-olefin compositions higher than the above higher limits for the second polymer component, the blends of the second polymer component and the first polymer component do not have the favorable tensile properties of the blends of the present invention. It is believed, while not meant to be limited thereby, the second polymer component needs to have the optimum amount of isotactic polypropylene crystallinity to crystallize with the first polymer component for the beneficial effects of the present invention. As discussed above, the preferred alpha-olefin is ethylene.

Generally, without limiting in any way the scope of the invention, one means for carrying out a process of the present invention for the production of the copolymer second polymer component is as follows: (1) liquid propylene is introduced in a stirred-tank reactor, (2) the catalyst system is introduced via nozzles in either the vapor or liquid phase, (3) feed ethylene gas is introduced either into the vapor phase of the reactor, or sparged into the liquid phase as is well known in the art, (4) the reactor contains a liquid phase composed substantially of propylene, together with dissolved alpha-olefin, preferably ethylene, and a vapor phase containing vapors of all monomers, (5) the reactor temperature and pressure may be controlled via reflux of vaporizing propylene (autorefrigeration), as well as by cooling coils, jackets, etc., (6) the polymerization rate is controlled by the concentration of catalyst, temperature, and (7) the ethylene (or other alpha-olefin) content of the polymer product is determined by the ratio of ethylene to propylene in the reactor, which is controlled by manipulating the relative feed rates of these components to the reactor.

For example, a typical polymerization process consists of a polymerization in the presence of a catalyst comprising a bis (cyclopentadienyl) metal compound and either 1) a non-coordinating compatible anion activator, or 2) an alumoxane activator. According to one embodiment of the invention, this comprises the steps of contacting ethylene and propylene with a catalyst in a suitable polymerization diluent, said catalyst comprising, for example, according to a preferred embodiment, a chiral metallocene catalyst, e.g., a bis (cyclopentadienyl) metal compound, as described in U.S. Pat. No. 5,198,401 which is herein incorporated by reference for purposes of U.S. practices and an activator. The activator used may be an alumoxane activator or a non-coordination compatible anion activator. The alumoxane activator is preferably utilized in an amount to provide a molar aluminum to metallocene ratio of from about 1:1 to about 20,000:1 or more. The non-coordinating compatible anion activator is preferably utilized in an amount to provide a molar ratio of biscyclopentadienyl metal compound to non-coordinating anion of 10:1 to about 1:1. The above polymerization reaction is conducted by reacting such monomers in the presence of such catalyst system at a temperature of from about −100° C. to about 300° C. for a time of from about 1 second to about 10 hours to produce a copolymer having a weight average molecular weight of from about 5,000 or less to about 1,000,000 or more and a molecular weight distribution of from about 1.8 to about 4.5.

While the process of the present invention includes utilizing a catalyst system in the liquid phase (slurry, solution, suspension or bulk phase or combination thereof), according to other embodiments, high-pressure fluid phase or gas phase polymerization can also be utilized. When utilized in a gas phase, slurry phase or suspension phase polymerization, the catalyst systems will preferably be supported catalyst systems. See, for example, U.S. Pat. No. 5,057,475, which is incorporated herein by reference for purposes of U.S. practice. Such catalyst systems can also include other well-known additives such as, for example, scavengers. See, for example, U.S. Pat. No. 5,153,157, which is incorporated herein by reference for purposes of U.S. practices. These processes may be employed without limitation of the type of reaction vessels and the mode of conducting the polymerization. As stated above, and while it is also true for systems utilizing a supported catalyst system, the liquid phase process comprises the steps of contacting ethylene and propylene with the catalyst system in a suitable polymerization diluent and reacting the monomers in the presence of the catalyst system for a time and at a temperature sufficient to produce an ethylene-propylene copolymer of the desired molecular weight and composition.

It is understood in the context of the present invention that, in one embodiment, more than one-second polymer component may be used in a single blend with a first polymer component. Each of the second polymer component components is described above and the number of second polymer component in this embodiment is less than three and more preferably, two. In this embodiment of the invention the second polymer components differ in the alpha-olefin content with one being in the range of 5 wt % to 9 wt % alpha-olefin while the other is in the range of 10 wt % to 22 wt % alpha-olefin. The preferred alpha-olefin is ethylene. It is believed that the use of two-second polymer component in conjunction with a single first polymer component leads to beneficial improvements in the tensile-elongation properties of the blends The Blend of First and Second Polymer Components The copolymer blends of the first polymer component and the second polymer component of the instant invention may be prepared by any procedure that guarantees the intimate admixture of the components. For example, the components can be combined by melt pressing the components together on a Carver press to a thickness of about 0.5 millimeter (20 mils) and a temperature of about 180° C., rolling up the resulting slab, folding the ends together, and repeating the pressing, rolling, and folding operation about 10 times. Internal mixers are particularly useful for solution or melt blending. Blending at a temperature of about 180° C. to 240° C. in a Brabender Plastograph for about 1 to 20 minutes has been found satisfactory. Still another method that may be used for admixing the components involves blending the polymers in a Banbury internal mixer above the flux temperature of all of the components, e.g., 180° C. for about 5 minutes. The complete admixture of the polymeric components is indicated by the narrowing of the crystallization and melting transitions characteristic of the polypropylene crystallinity of the components to give a single or a small range crystallization and melting points for the blend. These batch-mixing procedures are typically supplanted by continuous mixing processes in the industry. These processes are well known in the art and include single and twin screw mixing extruders, static mixers for mixing molten polymer streams of low viscosity, impingement mixers, as well as other machines and processes, designed to disperse the first polymer component and the second polymer component in intimate contact.

The thermoplastic polymer blend compositions of the present invention may comprise from about 2% to about 95% by weight of first polymer component. According to a preferred embodiment, the thermoplastic polymer blend composition of the present invention may comprise from about 2% to about 70% by weight of the first polymer component. According to the most preferred embodiment, the compositions of the present invention may comprise from about 5% to about 70% by weight of the first polymer component.

The compositions of the present invention may comprise from about 5% to about 98% by weight of the second polymer component. According to one preferred embodiment, the compositions of the present invention may comprise from about 30% to about 98% by weight of the second polymer component. Most preferably, the compositions of the present invention comprise from about 30% to about 95% by weight of the second polymer component.

The polymer blends of the instant invention exhibit a remarkable combination of desirable physical properties. The incorporation of as little as 5% first polymer component in the propylene/alpha-olefin copolymers increases the propylene sequence melting point or the polymer softening point but, more significantly, reduces the range as compared to the propylene/alpha-olefin copolymer. In addition, the incorporation of first polymer component in accordance with the instant invention nearly eliminates the stickiness caused by the propylene/alpha-olefin copolymer. Further, the thermal characteristics of the copolymer blends are markedly improved over those of the second polymer component, which is the propylene/alpha-olefin copolymers.

The crystallization temperature and the melting point of the blends are changed as a result of the blending operation. In an embodiment of the invention, the blend of first polymer component and second polymer component has single crystallization temperature and melting point. These temperatures are higher than the corresponding temperatures for the second polymer component and close to that of the first polymer component. In other embodiments, the second polymer component and the first polymer component have distinct melting and crystallization temperatures but have these temperatures closer together than would be expected for a combination of the second polymer component and the first polymer component. In all these cases the glass transition temperature of the second polymer component is retained in the polymer blend. This favorable combination of thermal properties permits their satisfactory use in injection molding operations without the orientation previously encountered. Injection molded articles prepared from the instant copolymer blends accordingly exhibit excellent long-term dimensional stability. The advantages referred to above are obtained without the need of elaborate purification of the propylene/alpha-olefin copolymer or the tedious preparation of a carefully structured block copolymer. Further, by the use of the second polymer component and the first polymer component, a blend can be obtained with a lower glass transition temperature than would be expected for a random copolymer of the same composition as the blend. In particular, the glass transition temperature of the blend is closer to that of the second polymer component and lower than the glass transition temperature of the first polymer component. This can be accomplished without an exceptionally high alpha-olefin content in the polymer blend which we believe, while not meant to be limited thereby, would lead to degradation of the tensile-elongation properties of the blend.

While the above discussion has been limited to the description of the invention in relation to having only components one and two, as will be evident to those skilled in the art, the polymer blend compositions of the present invention may comprise other additives. Various additives may be present in the composition of the invention to enhance a specific property or may be present as a result of processing of the individual components. Additives which may be incorporated include, for example, fire retardants, antioxidants, plasticizers, and pigments. Other additives which may be employed to enhance properties include antiblocking agents, coloring agents, stabilizers, and oxidative-, thermal-, and ultraviolet-light-inhibitors. Lubricants, mold release agents, nucleating agents, reinforcements, and fillers (including granular, fibrous, or powder-like) may also be employed. Nucleating agents and fillers tend to improve rigidity of the article. The list described herein is not intended to be inclusive of all types of additives which may be employed with the present invention. Upon reading this disclosure, those of skill in the art will appreciate other additives may be employed to enhance properties of the composition. As is understood by the skilled in the art, the polymer blend compositions of the present invention may be modified to adjust the characteristics of the blend as desired.

EXAMPLES

Example 1

Ethylene/Propylene Copolymerization

Continuous polymerization of the polymer is conducted in a 9 liter Continuous Flow Stirred Tank Reactor using hexane as the solvent. The liquid full reactor has a residence time of 9 minutes and the pressure is maintained at 700 kPa. A mixed feed of hexane, ethylene and propylene is pre-chilled to approximately −30° C. to remove the heat of polymerization, before entering the reactor. Solutions of catalyst/activator in toluene and the scavenger in hexane are separately and continuously admitted into the reactor to initiate the polymerization. The reactor temperature is maintained between 35 and 50° C., depending on the target molecular weight. The feed temperature is varied, depending on the polymerization rate to maintain a constant reactor temperature. The polymerization rate is varied from about 0.5 kg/hr to about 4 kg/hr. Hexane at 30 kg/hr is mixed with ethylene at 717 g/hr and propylene at 5.14 kg/hr and fed to the reactor. The polymerization catalyst, dimethylsilyl bridged bis-indenyl hafnium dimethyl activated 1.1 molar ratio with N', N'-dimethyl anilinium-tetrakis (pentafluorophenyl)borate is introduced at the rate of at 0.0135 g/hr. A dilute solution of triisobutyl aluminum is introduced into the reactor as a scavenger of catalyst terminators; a rate of approximately 111 mol of scavenger per mole of catalyst is adequate for this polymerization. After the polymerization reaches steady state, a representative sample of the polymer produced in this polymerization is collected, and then steam-distilled to isolate the polymer. The polymerization rate is measured as 3.7 kg/hr. The polymer produced in this polymerization has an ethylene content of 14%, ML (1+4) 125° C. (Mooney Viscosity) of 13.1 and has isotactic propylene sequences.

Variations in the composition of the polymer are obtained principally by changing the ratio of ethylene to propylene. Molecular weight of the polymer is varied by either changing the reactor temperature or by changing the ratio of total monomer feed rate to the polymerization rate.

In the manner described in Example 1 above, polymers of the above specification are synthesized. These are described in the tables below. Table 2 describes the results of the GPC, composition, and DSC analysis for the polymers.

TABLE 2

Analysis of the polymers

| | | $^{13}$C NMR RESULTS | | | | DSC Results | |
|---|---|---|---|---|---|---|---|
| Sample # | Ethylene (wt %) | Triad (mm) | 2, 1 insertion (%) | 1, 3 insertion (%) | m/r | Heat of fusion (J/g) | Melting Point (° C.) |
| #1 | 11.0 | 90.1 | 0.63 | 0.098 | 7.1 | 19 | 49 |
| #2 | 18.5 | 91.3 | 0.84 | 0.12 | 6.2 | 1.8 | 50 |
| #3 | 9.4 | 91.8 | 0.80 | 0.086 | 6.9 | 27 | 69 |
| #4 | 14.1 | 90.6 | 0.74 | 0.13 | 7.7 | 8.0 | 51 |

TABLE 3

Fractional solubility of copolymer (hexane)

| | Wt % soluble at T | | |
|---|---|---|---|
| Sample # | 23° C. | 31° C. | 40° C. |
| 1 | 39.2 | 60.0 | 0.5 |
| 2 | 97.6 | 2.1 | |
| 3 | 0.7 | 52.3 | 48.1 |
| 4 | 99.3 | 0.7 | |

Table 4 describes the composition of the fractions of the copolymer obtained in Table 3. Only fractions which have more than 4% of the total mass of the polymer have been analyzed for composition.

TABLE 4

Composition of fractions of the copolymer component obtained in Table 3

| | Composition (wt % C2) for fraction soluble at T | | |
|---|---|---|---|
| Sample # | 23° C. | 31° C. | 40° C. |
| 1 | 10.8 | 11.3 | — |
| 2 | 17.9 | — | |
| 3 | — | 9.9 | 10.2 |
| 4 | 14.5 | — | |

The experimental inaccuracy in the determination of the ethylene content is believed to be approximately 0.4 wt % absolute.

TABLE 5

Mechanical properties of the polymers

| | Mechanical Properties | | |
|---|---|---|---|
| Sample # | Tensile Strength (psi, MPa) | 500% Tensile Modulus (psi, MPa) | Elasticity (%) |
| 1 | 3226.5, 22.25 | 1412, 9.74 | 17 |
| 2 | 334.0, 2.30 | 129, 0.889 | 1.5 |

TABLE 5-continued

Mechanical properties of the polymers

| | Mechanical Properties | | |
|---|---|---|---|
| Sample # | Tensile Strength (psi, MPa) | 500% Tensile Modulus (psi, MPa) | Elasticity (%) |
| 3 | 5041.3, 34.76 | 2300, 15.86 | 24 |
| 4 | 1277.7, 8.810 | 387, 2.67 | 0 |

TABLE 6

| | Composition | Mechanical Properties | |
|---|---|---|---|
| Sample # | Ethylene Content (wt %) | 500% Tensile Modulus (MPa) | Elasticity (%) |
| 5 | 12.4 | 6.8 | 3.1 |
| 6 | 12.0 | 7.9 | 1.6 |
| 7 | 17.0 | 0.9 | 1.6 |
| 8 | 11.1 | 9.9 | 18.8 |
| 9 | 10.8 | 8.9 | 6.4 |
| 10 | 12.1 | 6.9 | 3.1 |
| 11 | 13.4 | 6.4 | 1.6 |
| 12 | 14.8 | 2.7 | 0 |
| 13 | 16.4 | 0.6 | 3.1 |
| 14 | 13.4 | 7.1 | 4.7 |

TABLE 7

| | Composition | Mechanical Properties | |
|---|---|---|---|
| Sample # | Ethylene Content (wt %) | 500% Tensile Modulus (MPa) | Flexural Modulus (Mpa) |
| 15 | 12.0 | 7.9 | 26.8 |
| 16 | 14.8 | 2.7 | 9.2 |
| 17 | 17.0 | 0.9 | 5.6 |
| 18 | 10.8 | 8.9 | 40.1 |
| 19 | 10.0 | 10.3 | 93.0 |

Although the present invention has been described in considerable detail with reference to certain aspects and embodiments thereof, other aspects and embodiments are possible. For example, while ethylene propylene copolymers have been exemplified, other copolymers are also contemplated. Therefore, the spirit and scope of the appended claims should not be limited to the description of the versions contained herein.

Certain features of the present invention are described in terms of a set of numerical upper limits and a set of numerical lower limits. It should be appreciated that ranges from any lower limit to any upper limit are within the scope of the invention unless otherwise indicated.

All patents, test procedures, and other documents cited in this application are fully incorporated by reference to the extent such disclosure is not inconsistent with this application and for all jurisdictions in which such incorporation is permitted.

What is claimed is:

1. A blend composition comprising,
    a) from 2% to 95% by weight of a first polymer component comprising a copolymer of 5% to 25% by weight of ethylene-derived units and 95% to 75% by weight of propylene-derived units, the first polymer component being produced by a metallocene catalyst system and having:
        i) a melting point of less than 90° C.;
        ii) a relationship of elasticity to 500% tensile modulus such that $$\text{Elasticity} \leq 0.935M + 12,$$

where elasticity is in percent and M is the 500% tensile modulus in MPa; and
        iii) a relationship of flexural modulus to 500% tensile modulus such that $$\text{Flexural Modulus} \leq 4.2e^{0.27M} + 50,$$

where flexural modulus is in MPa and M is the 500% tensile modulus in Mpa; and
    b) from 5% to 98% by weight of a second polymer component.

2. The composition of claim 1, wherein the first polymer component comprises 6% to 20% by weight of ethylene-derived units and 94% to 80% by weight of propylene-derived units.

3. The composition of claim 1, wherein the first polymer component comprises 8% to 20% by weight of ethylene-derived units and 92% to 80% by weight of propylene-derived units.

4. The composition of claim 1, wherein the first polymer component comprises 10% to 20% by weight of ethylene-derived units and 90% to 80% by weight of propylene-derived units.

5. The composition of claim 1, wherein the melting point of said first polymer component is between 25° C. and 90° C.

6. The composition of claim 1, wherein the melting point of said first polymer component is between 35° C. and 80° C.

7. The composition of claim 1, wherein the melting point of said first polymer component is between 45° C. and 70° C.

8. The composition of claim 1, wherein the relationship of elasticity to 500% tensile modulus of the first polymer component is:

$$\text{Elasticity} \leq 0.935M + 6.$$

9. The composition of claim 1, wherein the relationship of elasticity to 500% tensile modulus of the first polymer component is:

$$\text{Elasticity} \leq 0.935M.$$

10. The composition of claim 1, wherein the relationship of flexural modulus to 500% tensile modulus of the first polymer component is:

$$\text{Flexural Modulus} \leq 4.2e^{0.27M} + 30.$$

11. The composition of claim 1, wherein the relationship of flexural modulus to 500% tensile modulus of the first polymer component is:

$$\text{Flexural Modulus} \leq 4.2e^{0.27M} + 10.$$

12. The composition of claim 1, wherein the relationship of flexural modulus to 500% tensile modulus of the first polymer component is:

$$\text{Flexural Modulus} \leq 4.2e^{0.27M} + 2.$$

13. The composition of claim 1, wherein the first polymer component has a heat of fusion of from 1.0 J/g to 40 J/g.

14. The composition of claim 1, wherein the first polymer component has a heat of fusion of from 1.5 J/g to 30 J/g.

15. The composition of claim 1, wherein the first polymer component has a triad tacticity as determined by $^{13}$C NMR of greater than 75%.

16. The composition of claim 1, wherein the first polymer component has a triad tacticity as determined by $^{13}$C NMR of greater than 85%.

17. The composition of claim 1, wherein the first polymer component has a triad tacticity as determined by $^{13}$C NMR of greater than 90%.

18. The composition of claim 1, wherein the first polymer component has a tacticity index m/r of from 4 to 12.

19. The composition of claim 1, wherein the first polymer component has a tacticity index m/r of from 6 to 10.

20. The composition of claim 1, wherein the first polymer component has a proportion of inversely inserted propylene units based on 2,1 insertion of propylene monomer in all propylene insertions, as measured by $^{13}$C NMR, of greater than 0.5%.

21. The composition of claim 1, wherein the first polymer component has a proportion of inversely inserted propylene units based on 2,1 insertion of propylene monomer in all propylene insertions, as measured by $^{13}$C NMR, of greater than 0.6%.

22. The composition of claim 1, wherein the first polymer component has a proportion of inversely inserted propylene units based on 1,3 insertion of propylene monomer in all propylene insertions, as measured by $^{13}$C NMR, of greater than 0.05%.

23. The composition of claim 1, wherein the first polymer component has a proportion of inversely inserted propylene units based on 1,3 insertion of propylene monomer in all propylene insertions, as measured by $^{13}$C NMR, of greater than 0.07%.

24. The composition of claim 1, wherein the first polymer component has a proportion of inversely inserted propylene units based on 1,3 insertion of propylene monomer in all propylene insertions, as measured by $^{13}$C NMR, of greater than 0.085%.

25. The composition of claim 1, wherein the first polymer component has an intermolecular tacticity such that at least 75% by weight of the first polymer component is soluble in two adjacent temperature fractions of a thermal fractionation carried out in hexane in 8 C increments.

26. The composition of claim 1, wherein the first polymer component has an intermolecular tacticity such that at least 90% by weight of the first polymer component is soluble in two adjacent temperature fractions of a thermal fractionation carried out in hexane in 8 C increments.

27. The composition of claim 1, wherein the first polymer component has an intermolecular tacticity such that at least 97% by weight of the first polymer component is soluble in two adjacent temperature fractions of a thermal fractionation carried out in hexane in 8 C increments.

28. The composition of claim 1, wherein the first polymer component has a reactivity ratio product $r_1 r_2$ of less than 1.5.

29. The composition of claim 1, wherein the first polymer component has a molecular weight distribution Mw/Mn of from 1.5 to 5.

30. The composition of claim 1, wherein the first polymer component has a solid state $^1$H NMR relaxation time of less than 18 ms.

31. The composition of claim 1, wherein the elasticity of the first polymer component is less than 30%.

32. The composition of claim 1, wherein the 500% tensile modulus of the first polymer component is greater than 0.5 MPa.

33. The composition of claim 1, wherein the second polymer component has a molecular weight distribution of about 2.0 to about 3.2.

34. The composition of claim 1, wherein the second polymer component has a melting point by DSC between about 30° C. and about 100° C.

35. The composition of claim 1, wherein the composition has a glass transition temperature closer to that of the second polymer component and lower than the glass transition temperature of the first polymer component.

36. The composition of claim 1, wherein the second polymer component comprises a copolymer, optionally, comprising about 5% to about 25% by weight of an alpha-olefin.

37. The composition of claim 36, wherein the alpha-olefin of the second polymer component comprises ethylene.

38. The composition of claim 37, wherein the second polymer component comprises of from about 6% to about 18% by weight ethylene.

39. The composition of claim 1, wherein the metallocene catalyst system comprises a bis(cyclopentadienyl) metal compound, optionally, a non-coordinating anion, optionally, an alumoxane, and optionally, a support.

40. The composition of claim 39, wherein the metal is Hf.

41. The composition of claim 39, wherein the metallocene catalyst system comprises:

μ-(CH$_3$)$_2$Si(indenyl)$_2$M(Cl)$_2$,
μ-(CH$_3$)$_2$Si(indenyl)$_2$M(CH$_3$)$_2$,
μ-(CH$_3$)$_2$Si(tetrahydroindenyl)$_2$M(Cl)$_2$,
μ-(CH$_3$)$_2$Si(tetrahydroindenyl)$_2$M(CH$_3$)$_2$,
μ-(CH$_3$)$_2$Si(indenyl)$_2$M(CH$_2$CH$_3$)$_2$, or
μ-(C$_6$H$_5$)$_2$C(indenyl)$_2$M(CH$_3$)$_2$,
wherein M is Zr, Hf, or Ti.

42. The composition of claim 1, wherein the blend composition comprises from about 30% to about 95% of the first polymer component and from about 70% to about 5% of the second polymer component.

* * * * *